United States Patent
Tijhuis et al.

(10) Patent No.: US 10,974,417 B2
(45) Date of Patent: Apr. 13, 2021

(54) ENCAPSULATED STABILIZER COMPOSITIONS

(71) Applicant: CYTEC INDUSTRIES INC., Princeton, NJ (US)

(72) Inventors: Dinand Tijhuis, Nijverdal (NL); Erwin Tijhuis, Wierden (NL); Joseph Kozakiewicz, Trumbull, CT (US); Jerry Mon Hei Eng, Wilton, CT (US); Ram B. Gupta, Stamford, CT (US); David Vanzin, Franklin, TN (US); Shailesh Majmudar, Stamford, CT (US)

(73) Assignee: Cytec Industries Inc., Princeton, NJ (US)

(*) Notice: Subject to any disclaimer, the term of this patent is extended or adjusted under 35 U.S.C. 154(b) by 256 days.

(21) Appl. No.: 15/748,861

(22) PCT Filed: Jul. 29, 2016

(86) PCT No.: PCT/US2016/044721
§ 371 (c)(1),
(2) Date: Jan. 30, 2018

(87) PCT Pub. No.: WO2017/023755
PCT Pub. Date: Feb. 9, 2017

(65) Prior Publication Data
US 2018/0222087 A1    Aug. 9, 2018

Related U.S. Application Data

(60) Provisional application No. 62/199,265, filed on Jul. 31, 2015.

(51) Int. Cl.
*B29B 9/06* (2006.01)
*B29B 9/12* (2006.01)
(Continued)

(52) U.S. Cl.
CPC .......... *B29B 9/06* (2013.01); *B29B 9/12* (2013.01); *C08J 3/126* (2013.01); *C08J 3/226* (2013.01);
(Continued)

(58) Field of Classification Search
CPC .................................................. B29B 9/06
See application file for complete search history.

(56) References Cited

U.S. PATENT DOCUMENTS

| 3,694,402 A | 9/1972 | Essam |
| 8,173,735 B2 | 5/2012 | Saitou et al. |

(Continued)

FOREIGN PATENT DOCUMENTS

| CN | 1353738 A | 6/2002 |
| CN | 102399393 A | 4/2012 |

(Continued)

OTHER PUBLICATIONS

Anonymous: "Skin Technology (TM)—Addcomp Holland", Jan. 1, 2012 (Jan. 1, 2012), XP55308636, Retrieved from the Internet: URL:http://www.addcomp.nl/showcases/6-skin-technology [retrieved on Oct. 7, 2016], the whole document.

(Continued)

*Primary Examiner* — Larry W Thrower
(74) *Attorney, Agent, or Firm* — Charles E. Bell, Esq.; Dennis J. Jakiela

(57) ABSTRACT

Resin masterbatch compositions are provided as closed end pellets having a core including at least one additive and an outer layer comprising a polymer encapsulating the core, in which the thickness of the outer layer if from 0.001 mm to 1 cm. A stabilized composition is prepared from an organic material to be stabilized and the resin masterbatch composition. A process for producing the resin masterbatch composition includes co-extruding in tubular form a core mate- (Continued)

rial encapsulated by an outer layer, wherein the core material comprises at least one additive, and the outer layer comprises a polymer, to form a filled tube; passing the filled tube into a sealing device that cuts the filled tube into multiple discrete segments seals and simultaneously seals each end of each discrete segment, thereby forming closed end pellets; and cooling the closed end pellets.

13 Claims, 8 Drawing Sheets

(51) Int. Cl.
| | | |
|---|---|---|
| C08J 3/22 | (2006.01) | |
| C08L 33/26 | (2006.01) | |
| C08J 3/12 | (2006.01) | |
| C08K 9/10 | (2006.01) | |
| C08K 5/13 | (2006.01) | |
| C08K 5/3435 | (2006.01) | |
| C08K 5/46 | (2006.01) | |
| C08L 23/06 | (2006.01) | |
| C08L 23/12 | (2006.01) | |
| C08L 23/14 | (2006.01) | |
| C08L 25/06 | (2006.01) | |
| C08L 25/12 | (2006.01) | |
| B29B 9/14 | (2006.01) | |
| B29B 9/16 | (2006.01) | |

(52) U.S. Cl.
CPC .............. *C08K 5/13* (2013.01); *C08K 5/3435* (2013.01); *C08K 5/46* (2013.01); *C08K 9/10* (2013.01); *C08L 23/06* (2013.01); *C08L 23/12* (2013.01); *C08L 23/14* (2013.01); *C08L 25/06* (2013.01); *C08L 25/12* (2013.01); *C08L 33/26* (2013.01); *B29B 9/14* (2013.01); *B29B 2009/166* (2013.01); *C08J 2400/22* (2013.01); *C08L 2310/00* (2013.01)

(56) References Cited

U.S. PATENT DOCUMENTS

| | | |
|---|---|---|
| 9,376,550 B2 | 6/2016 | Ayabe et al. |
| 9,776,157 B2 | 10/2017 | Morita et al. |
| 2001/0044518 A1 | 11/2001 | Hoffmann et al. |
| 2013/0065994 A1 | 3/2013 | Yokota et al. |

FOREIGN PATENT DOCUMENTS

| | | |
|---|---|---|
| EP | 0320120 A1 | 6/1989 |
| EP | 0259960 B1 | 6/1994 |
| JP | 1207334 A2 | 8/1989 |
| JP | 9052956 | 2/1997 |
| JP | 2000080172 A | 3/2000 |
| JP | 4278738 B2 | 6/2009 |
| JP | 2012097130 A | 5/2012 |
| WO | 9507314 A1 | 3/1995 |
| WO | 0077084 A1 | 12/2000 |
| WO | 2007042438 A1 | 4/2007 |
| WO | 2011122229 A1 | 7/2013 |
| WO | 2014010492 A1 | 6/2016 |

OTHER PUBLICATIONS

The International Preliminary Report on Patentability of PCT/US2016/044721; dated Nov. 2, 2017.
Written Opinion and International Search Report of PCT/US2016/044721; dated Oct. 27, 2016.

A

B

C

D

E

F

G

H

I 1  2  3

1  2  3

A

B

C

D

E

F

G

H

I

ENCAPSULATED STABILIZER COMPOSITIONS

CROSS REFERENCE TO RELATED APPLICATIONS

This application is a § 371 filing of International Application No. PCT/US2016/044721, filed under the PCT on Jul. 29, 2016, which claims priority to U.S. Provisional Application No. 62/199,265, filed on Jul. 31, 2015, the entire disclosures of which are incorporated herein by reference.

BACKGROUND OF THE INVENTION

Field of the Invention. The present invention generally relates to stabilizer compositions for providing protection to organic polymers (plastics) against deleterious effects from air (oxygen), residual catalyst, mechanical stress, heat, and light. More particularly, the present invention relates to polymer additive (stabilizer) concentrates that are sticky, waxy, and/or viscous in nature that are encapsulated in a synthetic thermoplastic polymeric matrix, and which provide improved characteristics in shipping, handling, storage, and processing.

Description of the Related Art. A large body of art has been developed directed toward polymeric additive stabilizer compositions capable of inhibiting degradation in organic materials such as plastics and polymeric articles due to deleterious effects from air (oxygen), residual catalyst, mechanical stress, heat, and light wherein these additives are admixed with the organic materials. The stabilizers include several different classes of compounds, such as antioxidants, antiozonants, thermal or heat stabilizers, ultraviolet (UV) light stabilizers, UV absorbers, surfactants, densification aids, dispersant, pigments, metal oxides, thioesters, nickel compounds, free-radical inhibitors, anti-stat agents, anti-fog agents and anti-corrosive agents. In many cases, to obtain optimum protection, a mixture of compounds, each specifically selected to afford maximum protection against a certain type of degradation, is often used.

Although certain of such stabilizers may be added during the polymerization process, this approach may prove unsatisfactory for the incorporation of other additives. For example, the efficiency of the polymerization process may be adversely affected by interaction of the stabilizer(s) with the polymerization catalyst, the polymer stabilizer in question may exhibit incompatibility with other additives used in the polymerization process and/or the subsequent treatment of the polymer may be restricted by the presence of the incorporated stabilizer at such an early stage. One method of introducing the stabilizers which may be used individually, or in an additive "system" that includes a pre-formed blends of stabilizers is to admix with the polymer to be stabilized during post-reactor extrusion operations. In order to facilitate blending operations it is desirable to provide stabilizer in a granular form because many stabilizers can cake up or form rat-holes in feed hoppers, and/or feed unevenly through metering equipment. Moreover, certain stabilizers, often used in the manufacture of polymers can create hazardous airborne dusts during handling and blending operations. Powder additives are difficult to convey in the systems most commonly used in the plastics industry, and significant losses of the powders occur during conveying. Powder additives also are dusty, presenting a potential for dust explosion and potential health risks to workers, who either inhale the dust or whose skin comes into contact with the dust. Additionally, powders are difficult to meter accurately. Thus charging 100% individual additive components has several issues, e.g., dusty, multiple hopper/feeders for multiple additives, sticky due to equipment high temperature melting the additives, adding several component individually leads to inhomogeneity, additive agglomeration/poor dispersion in the polymer, storage agglomeration and shipping agglomeration. On the other hand, charging pre-formed blends of additives improves dispersion, less feeding system required, however, some issues remain unresolved, e.g., dusty when tumbled, stickiness from the high equipment temperature (hopper), migration of additives out of additive preform, storage agglomeration and shipping agglomeration.

Another method is to first prepare a stabilizer concentrate, a pre-blend of the stabilizer and a thermoplastic polymer which contains a high level of the stabilizer and which can, therefore, serve as a masterbatch or concentrate. The use of a masterbatch or concentrate is a generally preferred technique, particularly with liquid or pasty additives, as the neat use of additives having such physical form frequently gives rise to dosing problems and often requires special metering pumps or other expensive equipment. In general, however, it has been found difficult to obtain polymer additive concentrates having an additive concentration in excess of about 15 percent by weight in the masterbatch. In addition, the masterbatch technology still has the issue of migration/leakage of additives and stickiness from the high equipment temperature especially when the additives have a low melting point or are pasty or waxy. Consequently, the use of these masterbatches leads to low throughput due to bridging in the hopper, which ultimately increases processing times.

In order to overcome the low additive concentration problem in the masterbatch, European Patent Application Publication No. 259,960 A2 discloses a means of greatly increasing the percentage of polymer additive in such concentrates by employing a particulate solid, preferably silica, as an absorbent for liquid, pasty or waxy, low-melting point solid additives. This loaded absorbent is blended with a suitable polymer under conditions such that a super concentrate containing from 15-80 percent by weight of such an additive is formed. However while the polymer additive concentrates of EP 259,960 will provide masterbatches having greatly increased loads of liquid, paste or waxy additives, certain drawbacks exist with respect to such concentrates. Specifically, when such concentrates are downloaded into polymers which are extruded into clear films, the silica (or other particulate filler) adversely affects the clarity of the final film.

More recently, SKIN TECHNOLOGY™ from Addcomp Holland B.V. uses a two-layer approach featuring an inner additive layer and an outer protective layer to address some of the issues of master blend approach. Charging stabilizers by SKIN TECHNOLOGY™ addresses the migration issue of masterbatch blends to a certain extent and it claims to eliminate pellet agglomeration. However, while leakage during storage, transportation or use is reduced, it still persists in large part due to the open/cut ends. Reference is made to FIG. 1, which depicts typical product made using SKIN TECHNOLOGY™. This is particularly true for additives that are liquid, pasty or waxy in nature, or if a solid, have a low melting point. In addition, the concentration of typical stabilizers is about 25%.

Accordingly, a masterbatch delivery system that achieves homogeneity of multiple polymer additive stabilizers (and, thus, provides improved dispersion and processability in polymeric materials) at concentration levels greater than those provided by the prior art, and which alleviates storage and shipping agglomeration due to the migration of additives which are pasty, waxy, or have a low-melting point would be a useful advance in the art and could find rapid acceptance in the polymer industry.

SUMMARY OF THE INVENTION

A masterbatch delivery system that achieves homogeneity of multiple stabilizers (and, thus, provides improved dispersion and processability time in polymeric materials) at concentration levels greater than those provided by the systems or processes of the prior art, and which alleviates storage and shipping agglomeration due to stickiness from the migration of additives which are pasty, waxy, or have a low-melting point has now been discovered. An advantageous feature of the instant invention is its ability for increased throughput, particularly for pasty or waxy additives, or additives having low-melting points, because the additives of the masterbatch delivery system of the instant invention are encapsulated and do not migrate or cause the masterbatch to become sticky and, thus, does not clog processing equipment such as hoppers and extruders.

Accordingly, the present invention provides, in one aspect, encapsulated individual additive stabilizer or blends of neat additive stabilizer compositions, which are dust-free, leak-free and easy to handle, store, and transport. Such encapsulated stabilizers are easily fed to an extruder or other device wherein they are introduced into a molten polymer stream. In this step, the encapsulated stabilizer is diluted to the final end-use level for stabilization or introduction of appropriate stabilizer functionality to the polymer resin being produced. Such encapsulated stabilizer blends can also be useful when fed directly to the solid polymer and physically blended with the base polymer prior to the final melting, mixing, and pelletizing, or simultaneously fed to the final melting, mixing, and pelletizing device for the polymer resin being produced. The encapsulated stabilizers of the current invention have no deleterious effect on the final end use or product, as the encapsulant material is essentially the same as the polymeric resin or inert and non-migratory after it is introduced into the resin.

In one embodiment, the invention includes an encapsulated masterbatch stabilizer composition provided as a closed end pellet ("CEP") having a core and an outer layer having a polymer encapsulating the core, wherein the core contains at least one stabilizer. While the material making up the outer layer encapsulating the core predominantly includes a polymer, and the material making up the core predominantly includes a stabilizer additive, it is contemplated that in certain embodiments the outer layer can also include a stabilizer additive, and/or the core can include a polymeric material. In certain embodiments, the stabilizer additive can be the same in the core as in the outer layer. The same can be true of the polymeric material. In some embodiments, it can be the same in the core as it is in the outer layer. In such embodiments, only the concentrations would be different.

In another aspect, the invention provides processes for making the closed end pellet compositions by co-extruding the polymer outer layer and the core masterbatch stabilizer composition to form a tube wherein the core is encapsulated by the outer layer, passing the filled tube through a means for simultaneously sealing and cutting of the tube into multiple discrete segments, and cooling the segments, thereby forming multiple encapsulated pellets containing stabilizer composition, wherein the pellets are sealed at each end (closed end) of the tube from which the pellet is made. The invention also contemplates products (i.e., closed end pellets) produced by such processes.

In certain embodiments the diameter of the closed end pellet compositions and the thickness of the wall of the tube can be changed by using different extrusion die dimensions.

In another aspect, the invention provides various uses of the closed end pellet stabilizer compositions for moulding/compounding into polymeric articles; for use in water or solvent-borne coatings; fabrication of solar panels; and in inks.

These and other objects, features and advantages of this invention will become apparent from the following detailed description of the various aspects of the invention taken in conjunction with the accompanying Figures and Examples.

BRIEF DESCRIPTION OF THE DRAWINGS

FIGS. 3A-I—Effect of closed end pellets (CEPs) on extruder feed-throat bridging. FIGS. 3A-C: CYASORB® UV-3853S flake masterbatch, (A) start; (B) 1 hour at 90-100° F.; (C) after rotating extruder screw. FIGS. 3D-F: CYASORB® UV-3853 PP5 cylindrical pellet masterbatch, (D) start; (E) 1 hour at 90-100° F.; (F) after rotating extruder screw; FIGS. 3G-I: CYASORB® UV-3853 70% CEP masterbatch, (G) start; (H) 1 hour at 90-100° F.; (I) after rotating extruder screw.

FIGS. 4A1-3: CYASORB® UV-3853 CEPs with PP, (1) 50% CYASORB® UV-3853; (2) 60% CYASORB® UV-3853; and (3) 70% CYASORB® UV-3853; FIGS. 4B1-3: (1) CYASORB® UV-3853S flake masterbatch; (2) CYASORB® UV-3853PP5 round pellets; and (3) CYASORB® UV-3853PP5 cylindrical pellets.

FIG. 5A: 50% CYASORB® UV-3853 CEP with PP; FIG. 5B: 60% CYASORB® UV-3853 CEP with PP; FIG. 5C: 70% CYASORB® UV-3853 CEP with PP; FIG. 5D: 50% CYASORB® UV-3853 CEP with PE; FIG. 5E: 70% CYASORB® 3853 CEP with PE; FIG. 5F: 60% CYASORB® UV-3853 CEP with SAN; FIG. 5G: CYASORB® UV-3853S flake masterbatch (50% active in LDPE); FIG. 5H: CYASORB® UV-3853PP5 round pellets (50% active in PP); FIG. 5I CYASORB® 3853 PP5 cylindrical pellets (50% active in PP).

DETAILED DESCRIPTION OF CERTAIN EMBODIMENTS OF THE INVENTION

Figure 1:
FIG. 1—Cylindrical pellets produced using SKIN TECHNOLOGY™.

In one aspect, the present invention provides a new composition of encapsulated additives. The encapsulated additives comprise a core material which comprises of at least one additive, and an outer layer having a polymeric material that completely encapsulates the core material. The encapsulating polymer is preferably a thermoplastic polymer which comprises at least one of: polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene terpolymers, styrene-acrylonitrile copolymers, acrylate-styrene-acrylonitrile terpolymers, cellulosic acetate butyrate, cellulosic polymers, polyimides, polyamideimides, polyetherimides, polyphenylene sulfides, polyphenylene oxides, polysulfones, polyethersulfones, polyvinyl chlorides, polycarbonates, polyketones, aliphatic polyketones, ethylene vinyl acetate copolymers, and mixtures thereof. The at least one additive comprising the core material is preferably selected from the group consisting of hindered amine light stabilizers (HALS), ultraviolet light absorbers, phenolic antioxidants, hindered benzoates, 3-arylbenzofuranones, chromane-based compounds, alkaline metal salts of fatty acids, hydroxylamines, amine oxides, surfactants, densification aid, dispersant, organophosphites, pigments, metal oxides, organophosphonites, thioesters, nickel compounds, free-radical inhibitor, anti-stat agents, anti-corrosive agent, catalyst, metal-extractant, photoinitiator, crosslinking agents; and a mixture of any two or more thereof.

In another aspect, the present invention provides a process for making encapsulated stabilizers comprising a core material, which comprises at least one stabilizer and an outer layer having a polymeric material that encapsulates the core material completely. The process comprises co-forming a tube comprised of a polymeric material and filled with the core material having at least one stabilizer additive by simultaneously feeding the polymer for the outer layer in one part of an extruder, and feeding the core material into another part of the same extruder and co-extruding the outer layer and the core, thereby forming a polymeric tube filled with the core material. The filled tube is then passed into a closing device (e.g., a gearwheel) for sealing, whereby the gearwheel simultaneous seals/welds and cuts the polymeric tube filled with the core material into multiple discrete segments. The segments are then cooled, thereby forming multiple encapsulated pellets containing stabilizer composition, wherein the pellets are sealed at each end (closed end) of the tube from which the pellet is made. The dried pellets then go through a separator and are then packed.

In yet another aspect, the present inventions provides a method of introducing encapsulated stabilizers in to polymers. The encapsulated stabilizers can be admixed with the polymer using devices such as calenders, mixers, kneaders, extruders and the like. In yet another aspect, the present invention provides a new composition of encapsulated stabilizers admixed with the polymer to be stabilized.

The amount of base stabilizer(s) in the encapsulated CEP can range from about 20 wt. % to about 95 wt. %, and preferably from 30 wt. % to about 90 wt. %. These encapsulated stabilizers are useful in polymer resin production processes, especially in the manufacture of polymers whereby after polymerization, the polymer is fed to an extruder or other device in which the polymer is melted in order to introduce encapsulated stabilizer to the molten polymer stream. Such stabilizers are essential for maintaining and improving the properties of polymers and for adding functionality or other performance features to said polymers.

The current invention of closed end pellets (CEP) eliminates the friability or attrition performance of pellets. Friability and attrition usually refer to the same phenomenon, wherein the pellets can generate fine powder inside its container during transport of the pellets. The resistance to friability or attrition is highly desirable, as very little fines are generated.

These and other aspects of the invention are described in more detail herein. As employed throughout the disclosure, the following terms and definitions are provided to assist the reader. Unless otherwise defined, all terms of art, notations and other scientific terminology used herein are intended to have the meanings commonly understood by those of skill in the chemical arts. As used herein and in the appended claims, the singular forms include plural referents unless the context clearly dictates otherwise. Additionally, as used herein and in the appended claims, the disclosure of any ranges of amounts or concentrations includes the disclosure of any amount or value in the given range.

The abbreviation "MB" refers to "masterbatch", which is a concentrated blend of additive with a polymer; "cylindrical pellets", or "skin" refers to partially encapsulated stabilizer, i.e. stabilizer encapsulated with a cylindrical shell of thermoplastic polymer, but with open ends, known as SKIN TECHNOLOGY™ from Addcomp Holland B.V.; "CEP" refers to "closed end pellet", or polymer encapsulated stabilizer in which the two ends of each tube are sealed off; "PP" refers to polypropylene; "PPC" refers to polypropylene copolymer, "PE" refers to polyethylene, "LDPE" refers to low density polyethylene; and "SAN" refers to styrene-acrylonitrile copolymer. All percents refer to weight/weight percent (wt. %), unless indicated otherwise by context.

Throughout this specification the terms and substituents retain their definitions. A comprehensive list of abbreviations utilized by organic chemists (i.e. persons of ordinary skill in the art) appears in the first issue of each volume of the *Journal of Organic Chemistry*. The list, which is typically presented in a table entitled "Standard List of Abbreviations", is incorporated herein by reference.

The term "hydrocarbyl" is a generic term encompassing aliphatic, alicyclic and aromatic groups having an all-carbon backbone and consisting of carbon and hydrogen atoms. In certain cases, as defined herein, one or more of the carbon atoms making up the carbon backbone may be replaced or interrupted by a specified atom or group of atoms, such as by one or more heteroatom of N, O, and/or S. Examples of hydrocarbyl groups include alkyl, cycloalkyl, cycloalkenyl, carbocyclic aryl, alkenyl, alkynyl, alkylcycloalkyl, cycloalkylalkyl, cycloalkenylalkyl, and carbocyclic aralkyl, alkaryl, aralkenyl and aralkynyl groups. Such hydrocarbyl groups can also be optionally substituted by one or more substituents as defined herein. Accordingly, the chemical groups or moieties discussed in the specification and claims should be understood to include the substituted or unsubstituted forms. The examples and preferences expressed below also apply to each of the hydrocarbyl substituent groups or hydrocarbyl-containing substituent groups referred to in the various definitions of sub stituents for compounds of the formulas described herein unless the context indicates otherwise.

Preferred non-aromatic hydrocarbyl groups are saturated groups such as alkyl and cycloalkyl groups. Generally, and by way of example, the hydrocarbyl groups can have up to fifty carbon atoms, unless the context requires otherwise. Hydrocarbyl groups with from 1 to 30 carbon atoms are preferred. Within the sub-set of hydrocarbyl groups having 1 to 30 carbon atoms, particular examples are $C_{1-20}$ hydrocarbyl groups, such as $C_{1-12}$ hydrocarbyl groups (e.g. $C_{1-6}$ hydrocarbyl groups or $C_{1-4}$ hydrocarbyl groups), specific examples being any individual value or combination of values selected from $C_1$ through $C_{30}$ hydrocarbyl groups.

Alkyl is intended to include linear, branched, or cyclic hydrocarbon structures and combinations thereof. Lower alkyl refers to alkyl groups of from 1 to 6 carbon atoms. Examples of lower alkyl groups include methyl, ethyl, propyl, isopropyl, butyl, s-and t-butyl and the like. Preferred alkyl groups are those of $C_{30}$ or below.

Alkoxy or alkoxyalkyl refers to groups of from 1 to 20 carbon atoms of a straight, branched, cyclic configuration and combinations thereof attached to the parent structure through an oxygen atom. Examples include methoxy, ethoxy, propoxy, isopropoxy, cyclopropyloxy, cyclohexyloxy and the like.

Acyl refers to formyl and to groups of 1, 2, 3, 4, 5, 6, 7, 8, 9, 10, 11 and 12 carbon atoms of a straight, branched, cyclic configuration, saturated, unsaturated and aromatic and combinations thereof, attached to the parent structure through a carbonyl functionality. Examples include acetyl, benzoyl, propionyl, isobutyryl, tert-butoxycarbonyl, benzyloxycarbonyl and the like. Lower-acyl refers to groups containing one to six carbons.

References to "carbocyclic" or "cycloalkyl" groups as used herein shall, unless the context indicates otherwise, include both aromatic and non-aromatic ring systems. Thus, for example, the term includes within its scope aromatic, non-aromatic, unsaturated, partially saturated and fully saturated carbocyclic ring systems. In general, such groups may be monocyclic or bicyclic and may contain, for example, 3 to 12 ring members, more usually 5 to 10 ring members. Examples of monocyclic groups are groups containing 3, 4, 5, 6, 7, and 8 ring members, more usually 3 to 7, and preferably 5 or 6 ring members. Examples of bicyclic groups are those containing 8, 9, 10, 11 and 12 ring members, and more usually 9 or 10 ring members. Examples of non-aromatic carbocycle/cycloalkyl groups include c-propyl, c-butyl, c-pentyl, c-hexyl, and the like. Examples of $C_7$ to $C_{10}$ polycyclic hydrocarbons include ring systems such as norbornyl and adamantyl.

Aryl (carbocyclic aryl) refers to a 5- or 6-membered aromatic carbocycle ring containing; a bicyclic 9- or 10-membered aromatic ring system; or a tricyclic 13- or 14-membered aromatic ring system. The aromatic 6- to 14-membered carbocyclic rings include, e.g., substituted or unsubstituted phenyl groups, benzene, naphthalene, indane, tetralin, and fluorene.

Substituted hydrocarbyl, alkyl, aryl, cycloalkyl, alkoxy, etc. refer to the specific substituent wherein up to three H atoms in each residue are replaced with alkyl, halogen, haloalkyl, hydroxy, alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, halobenzyl, heteroaryl, phenoxy, benzyloxy, heteroaryloxy, benzoyl, halobenzoyl, or lower alkylhydroxy.

"(Meth)acrylate" is shorthand for acrylate or methacrylate.

A resin masterbatch composition provided as closed end pellets comprising a core and an outer layer encapsulating the core, wherein the core comprises at least one additive, and the outer layer comprises a polymer, characterized in that the thickness of the outer layer is from 0.001 mm to 1 cm.

The outer layer used for encapsulating the core is a polymer. The polymer can be a thermoplastic polymer, a thermoset polymer, a water-soluble or water-dispersible polymer, a biodegradable polymer, or a combination thereof. In some embodiments, the polymer is a thermoplastic polymer. In some embodiments, the polymer is a thermoplastic polymer comprising at least one of: polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, acrylonitrile-butadiene-styrene terpolymers, styrene-acrylonitrile copolymers, acrylate-styrene-acrylonitrile terpolymers, cellulosic acetate butyrate, cellulosic polymers, polyimides, polyamideimides, polyetherimides, polyphenylene sulfides, polyphenylene oxides, polysulfones, polyethersulfones, polyvinyl chlorides, polycarbonates, and ethylene-vinyl acetate copolymers.

Further, the thermoplastic "polyolefin" polymer can be chosen from a member selected from the group consisting of i) polymers of monoolefins chosen from polypropylene, polyisobutylene, polybut-1-ene, poly-4-methylpent-1-ene; ii) diolefins chosen from polyisoprene or polybutadiene; iii) polymers of cycloolefins chosen from cyclopentene, and norbornene; iv) polyethylene chosen from optionally cross-linked polyethylene, high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), very low density polyethylene (VLDPE), and ultralow density polyethylene (ULDPE); v) copolymers thereof; and vi) mixtures thereof.

The polymer can be a biodegradable polymer. Examples of biodegradable polymers include polylactic acid, polyhydroxybutyrate, polybutylene succinate, polycaprolactone, polyhydroxyhexanoate, aliphatic-aromatic copolyesters, polyhydroxyvalerate, polybutylene succinate adipate, polybutylene adipate/terephthalate, polyethylene terephthalate, polymethylene adipate/terephthalate, and mixtures thereof.

In some embodiments, the polymer is a water-soluble polymer or water-dispersible polymer. Examples of water-soluble or water-dispersible polymers include cellulose derivatives, polyethylene oxide, polypropylene oxide, hydroxypropyl cellulose, guar, polyvinyl pyrrolidone, polyvinyl caprolactam polyacrylamide, polyhydroxymethacrylate, polyvinyl imidazole, polyvinyl alcohol, polyhydroxyethymethacrylate, silicone polymers, and mixtures thereof.

In some embodiments, the polymer comprises at least one of polyethylene, polypropylene, a polypropylene copolymer, polystyrene, and a styrene-acrylonitrile copolymer. In some embodiments, the thermoplastic polymer is polypropylene (PP) or polypropylene copolymer (PPC). The polypropylene copolymer can be a copolymer of propylene and ethylene, and can be a random copolymer, a block copolymer, or an impact copolymer. In some embodiments, the thermoplastic polymer is polystyrene.

The encapsulating outer layer comprising the polymer has a tubular form. The thickness of the outer layer is from 0.001 mm to 1 cm, preferably from 0.001 to 1 mm. The dimensions of the closed end pellet are from 0.1 to 5 cm long, preferably 0.2 to 5 cm. The core material can be solid, semi-solid, waxy, or liquid at room temperature, wherein room temperature is defined as 25° C. The core material comprising at least one additive is from 10 to 95 wt. %, 20 to 95 wt. %, or 30 to 90 wt. % of the total weight of the closed end pellet. Preferably, the core material is from 40 to 80 wt. % of the total weight of the closed end pellet. More preferably, the core material is from 50 to 75 wt. %, of the total weight of the encapsulated composition.

The composition of core material comprises of at least one additive. Examples of additives include hindered amine light stabilizers (HALS), ultraviolet light absorbers, phenolic antioxidants, hindered benzoates, 3-arylbenzofuranones, chromanes, alkaline metal salts of fatty acids, hydroxylamines, amine oxides, surfactants, densification aids, dispersants, organophosphites, pigments, metal oxides, organophosphonites, thioesters, nickel compounds, free-radical polymerization inhibitors, anti-stat agents, anti-corrosive agents, catalysts, metal-extractants, photoinitiators, cross-linking agents; and a mixture of any two or more thereof.

In some embodiments, the at least one additive comprises a stabilizer. The stabilizer can comprise at least one of a hindered amine light stabilizer (HALS), an organic phosphite or phosphonite, a hindered phenol, a chromane, an ultraviolet light (UV) absorber, a hindered benzoate, a hydroxylamine, a tertiary amine oxide, and a free radical polymerization inhibitor.

The "hindered amine light stabilizer (HALS)" is a compound comprising a molecular fragment according to Formula (I)

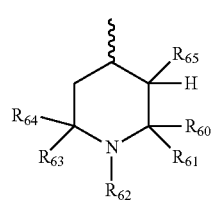

(I)

wherein:
$R_{62}$ is chosen from a member selected from the group consisting of hydrogen; OH; $C_1$-$C_{20}$ hydrocarbyl; —$CH_2CN$; $C_1$-$C_{12}$ acyl; and $C_1$-$C_{18}$ alkoxy;
$R_{65}$ is chosen from a member selected from the group consisting of hydrogen; and $C_1$-$C_8$ hydrocarbyl; and
each of $R_{60}$, $R_{61}$, $R_{63}$, and $R_{64}$ is independently chosen from a $C_1$-$C_{20}$ hydrocarbyl, or $R_{60}$ and $R_{61}$ and/or $R_{63}$ and $R_{64}$ taken together with the carbon to which they are attached form a $C_5$-$C_{10}$ cycloalkyl;
or Formula (II)

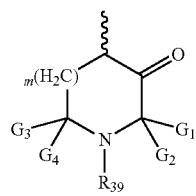

(II)

wherein:
m is an integer from 1 to 2;
$R_{39}$ is chosen from a member selected from the group consisting of hydrogen; OH; $C_1$-$C_{20}$ hydrocarbyl; —$CH_2CN$; $C_1$-$C_{12}$ acyl; and $C_1$-$C_{18}$ alkoxy; and
each of $G_1$-$G_4$ is independently chosen from a $C_1$-$C_{20}$ hydrocarbyl.

The hindered amine light stabilizer is preferably chosen from a member selected from the group consisting of bis(2,2,6,6-tetramethylpiperidin-4-yl) sebacate; bis(2,2,6,6-tetramethylpiperidin-4-yl) succinate; bis(1,2,2,6,6-pentamethylpiperidin-4-yl) sebacate; bis(1-octyloxy-2,2,6,6-tetramethylpiperidin-4-yl) sebacate; bis(1,2,2,6,6-pentamethylpiperidin-4-yl) n-butyl 3,5-di-tert-butyl-4-hydroxybenzylmalonate; a condensate of 1-(2-hydroxyethyl)-2,2,6,6-tetramethyl-4-hydroxypiperidine and succinic acid; 2,2,6,6-tetramethylpiperidin-4-yl stearate; 2,2,6,6-tetramethylpiperidin-4-yl dodecanate; 1,2,2,6,6-pentamethylpiperidin-4-yl stearate; 1,2,2,6,6-pentamethylpiperidin-4-yl dodecanate; a condensate of N,N'-bis(2,2,6,6-tetramethylpiperidin-4-yl)hexamethylenediamine and 4-tert-octylamino-2,6-dichloro-1,3,5-triazine; tris(2,2,6,6-tetramethylpiperidin-4-yl) nitrilotriacetate; tetrakis(2,2,6,6-tetramethylpiperidin-4-yl)-1,2,3,4-butanetetracarboxylate; 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl) sebacate; bis(1-octyloxy-2,2,6,6-tetramethylpiperidyl) succinate; a condensate of N,N'-bis(2,2,6,6-tetramethylpiperidin-4-yl)hexamethylenediamine and 4-morpholino-2,6-dichloro-1,3,5-triazine (CYASORB® UV-3346); a condensate of 2-chloro-4,6-bis(4-n-butylamino-2,2,6,6-tetramethylpiperidyl)-1,3,5-triazine and 1,2-bis(3-aminopropylamino)ethane; a condensate of 2-chloro-4,6-bis(4-n-butylamino-1,2,2,6,6-pentamethylpiperidyl)-1, 3,5-triazine and 1,2-bis-(3-aminopropylamino)ethane; 8-acetyl-3-dodecyl-7,7,9,9-tetramethyl-1,3,8-triazaspiro [4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; a condensate of N,N'-bis (2,2,6,6-tetramethylpiperidin-4-yl)hexamethylenediamine and 4-cyclohexylamino-2,6-dichloro-1,3,5-triazine; a condensate of 1,2-bis(3-aminopropylamino)ethane, 2,4,6-trichloro-1,3,5-triazine and 4-butylamino-2,2,6,6-tetramethylpiperidine; 2-undecyl-7,7,9,9-tetramethyl-1-oxa-3,8-diaza-4-oxospiro[4.5]decane; oxo-piperanzinyl-triazines; a reaction product of 7,7,9,9-tetramethyl-2-cycloundecyl-1-oxa-3,8-diaza-4-oxospiro[4.5]decane and epichlorohydrin; tetrakis(2,2,6,6-tetramethyl-4-piperidyl) butane-1,2,3,4-tetracarboxylate; 1,2,3,4-butanetetracarboxylic acid, tetrakis (1,2,2,6,6-pentamethyl-4-piperidinyl)ester; 1,2,3,4-butanetetracarboxylic acid, 1,2,2,6,6-pentamethyl-4-piperdinyl tridecyl ester; 1,2,3,4-butanetetracarboxylic acid, 2,2,6,6-tetramethyl-4-piperidinyl tridecyl ester; 1,2,3,4-butanetetracarboxylic acid, polymer with 2,2,6,6-tetramethyl-2,4,8,10-tetraoxaspiro[5.5]-undecane-3,9-diethano1,1,2,2,6,6-pentamethyl-4-piperdinyl ester; 1,2,3,4-butanetetracarboxylic acid, polymer with 2,2,6,6-tetramethyl-2,4,8,10-tetraoxaspiro[5.5]-undecane-3,9-diethanol, 2,2,6,6-tetramethyl-4-piperdinyl ester; bis(1-undecanoxy-2,2,6,6-tetramethylpiperidin-4-yl)carbonate; 1-(2-hydroxy-2-methylpropoxy)-2,2,6,6-tetramethyl-4-piperdinol; 1-(2-hydroxy-2-methylpropoxy)-4-octadecanoyloxy-2,2,6,6-tetramethylpiperidine: 1-(4-octadecanoyloxy-2,2,6,6-tetramethylpiperidin-1yloxy)-2-octadecanoyloxy-2-methylpropane; 1-(2-hydroxyethyl)-2,2,6,6-tetramethyl-4-piperdinol; a reaction product of 1-(2-hydroxyethyl)-2,2,6,6-tetramethyl-4-piperdinol and dimethyl succinate; 2,2,4,4-tetramethyl-7-oxa-3,20-diazadispiro[5.1.11.2]heneicosan-21-one; the ester of 2,2,6,6-tetramethyl-4-piperidinol with higher fatty acids, e.g. $C_{12-21}$-saturated and $C_{18}$-unsaturated fatty acids (CYASORB® UV-3853); 3-dodecyl-1-(2,2,6,6-tetramethyl-4-piperidyl)pyrrolidine-2,5-dione; 1H-pyrrole-2,5-dione, 1-octadecyl-, polymer with (1-methylethenyl) benzene and 1-(2,2,6,6-tetramethyl-4-piperidinyl)-1H-pyrrole-2,5-dione; piperazinone, 1,1',1"-[1,3,5-triazine-2,4, 6-triyltris[(cyclohexylimino)-2,1-ethanediyl]]tris[3,3,5,5-tetramethyl-; piperazinone, 1,1',1"-[1,3,5-triazine-2,4,6-triyltris[(cyclohexylimino)-2,1-ethanediyl]]tris[3,3,4,5,5-pentamethyl-; the reaction product of 7,7,9,9-tetramethyl-2-cycloundecyl-1-oxa-3,8-diaza-4-oxospiro[4.5]decane and epichlorohydrin; the condensate of N,N'-bis(2,2,6,6-tetramethylpiperidin-4-yl)hexamethylenediamine and 4-cyclohexylamino-2,6-dichloro-1,3,5-triazine; the condensate of 1,2-bis(3-aminopropylamino)ethane, 2,4,6-trichloro-1,3,5-triazine and 4-butylamino-2,2,6,6-tetramethylpiperidine; the condensate of N,N'-bis(2,2,6,6-tetramethylpiperidin-4-yl)hexamethylenediamine and 4-morpholino-2,6-dichloro-1,3,5-triazine; the condensate of 2-chloro-4,6-bis(4-n-butylamino-2,2,6,6-tetramethylpiperidyl)-1,3,5-triazine and 1,2-bis(3-aminopropylamino)ethane; the condensate of 2-chloro-4,6-bis(4-n-butylamino-1,2,2,6,6-pentamethylpiperidyl)-1,3,5-triazine and 1,2-bis-(3-aminopropylamino)ethane; 2-[(2-hydroxyethyl)amino]-4,6-bis[N-(1-cyclohexyloxy-2,2,6,6-tetramethylpiperidin-4-yl)butylamino-1,3,5-triazine; propanedioic acid, [(4-methoxyphenyl)-methylene]-bis-(1,2,2,6,6-pentamethyl-4-piperidinyl) ester; tetrakis(2,2,6,6-tetramethylpiperidin-4-yl)-1,2,3,4-butanetetracarboxylate; benzenepropanoic acid, 3,5-bis(1,1-dimethylethyl)-4-hydroxy-, 1-[2-[3-[3,5-bis(1,1-dimethylethyl)-4-hydroxyphenyl]-1-oxopropoxy]ethyl]-2,2,6,6-tetramethyl-4-piperidinyl ester; N-(1-octyloxy-2,2,6,6-tetramethylpiperidin-4-yl)-N'-dodecyloxalamide; tris(2,2,6,6-tetramethylpiperidin-4-yl) nitrilotriacetate; 1,5-dioxaspiro{5,5}undecane-3,3-dicarboxylic acid, bis(1,2,2,6,6-pentamethyl-4-piperidinyl): 1,5-dioxaspiro {5,5}undecane-3,3-dicarboxylic acid, bis(2,2,6,6-tetramethyl-4-piperidinyl); the condensate of 1-(2-hydroxyethyl)-2,2,6,6-tetramethyl-4-hydroxypiperidine and succinic acid; the condensate of N,N'-bis(2,2,6,6-tetramethylpiperidin-4-yl)hexamethylenediamine and 4-tert-octylamino-2,6-dichloro-1,3,5-triazine; 1,2,3,4-butanetetracarboxylic acid, 1,2,2,6,6-pentamethyl-4-piperidinyl tridecyl ester; tetrakis(2,2,6,6-tetramethylpiperidin-4-yl)-1,2,3,4-butanetetracarboxylate; 1,2,3,4-butanetetracarboxylic acid, 2,2,6,6-tetramethyl-4-piperidinyl tridecyl ester; tetrakis(1,2,2,6,6-pentamethylpiperidin-4-yl)-1,2,3,4-butanetetracarboxylate; mixture of 2,2,4,4-tetramethyl-21-oxo-7-oxa-3.20-diazaspiro(5.1.11.2)-heneicosane-20-propanoic acid-dodecyl ester and 2,2,4,4-tetramethyl-21-oxo-7-oxa-3.20-diazaspiro(5.1.11.2)-heneicosane-20-propanoic acid-tetradecyl ester; 1H,4H,5H,8H-2,3a,4a,6,7a,8a-hexaazacyclopenta[def]fluorene-4,8-dione, hexahydro-2,6-bis(2,2,6,6-tetramethyl-4-piperidinyl)-; polymethyl[propyl-3-oxy(2', 2',6',6'-tetramethyl-4,4'-piperidinyl)]siloxane; polymethyl[propyl-3-oxy(1',2',2',6',6'-pentamethyl-4,4'-piperidinyl)]siloxane; copolymer of methyl methacrylate with ethyl acrylate and 2,2,6,6-tetramethylpiperidin-4-yl acrylate; copolymer of mixed $C_{20}$ to $C_{24}$ alpha-olefins and (2,2,6,6-tetramethylpiperidin-4-yl)succinimide; 1,2,3,4-butanetetracarboxylic acid, polymer with β,β,β',β'-tetramethyl-2,4,8,10-tetraoxaspiro [5.5]undecane-3,9-diethanol, 1,2,2,6,6-pentamethyl-4-piperidinyl ester; 1,2,3,4-butanetetracarboxylic acid, polymer with β,β,β',β'-tetramethyl-2,4,8,10-tetraoxaspiro[5.5]undecane-3,9-diethanol, 2,2,6,6-tetramethyl-4-piperidinyl ester copolymer; 1,3-benzenedicarboxamide, N,N'-bis(2,2,6,6-tetramethyl-4-piperidinyl; 1,1'-(1,10-dioxo-1,10-decanediyl)-bis(hexahydro-2,2,4,4,6-pentamethylpyrimidine); ethane diamide, N-(1-acetyl-2,2,6,6-tetramethylpiperidinyl)-N'-dodecyl; formamide, N,N'-1,6-hexanediylbis[N-(2,2,6,6-tetramethyl-4-piperidinyl]; D-glucitol, 1,3:2,4-bis-O-(2,2,6,6-tetramethyl-4-piperidinylidene)-; 2,2,4,4-tetramethyl-7-oxa-3,20-diaza-21-oxo-dispiro[5.1.11.2]heneicosane; propanamide, 2-methyl-N-(2,2,6,6-tetramethyl-4-piperidinyl)-2-[(2,2,6,6-tetramethyl-4-piperidinyl)amino]-; 7-oxa-3,20-diazadispiro[5.1.11.2]heneicosane-20-propanoic acid, 2,2,4,4-tetramethyl-21-oxo-, dodecyl ester; N-(2,2,6,6-tetramethylpiperidin-4-yl)-β-aminopropionic acid dodecyl ester; N-(2,2,6,6-tetramethylpiperidin-4-yl)-N'-aminooxalamide; propanamide, N-(2,2,6,6-tetramethyl-4-piperidinyl)-3-[(2,2,6,6-tetramethyl-4-piperidinyl)amino]-; mixture of 4-hexadecyloxy- and 4-stearyloxy-2,2,6,6-tetramethylpiperidine; 3-dodecyl-1-(1,2,2,6,6-pentamethylpiperidin-4-yl)pyrrolidine-2,5-dione; 3-dodecyl-1-(1-ethanoyl-2,2,6,6-pentamethylpiperidin-4-yl)pyrrolidine-2,5-dione; bis(2,2,6,6-tetramethylpiperidin-4-yl)succinate; bis(1,2,2,6,6-pentamethylpiperidin-4-yl) n-butyl 3,5-di-tert-butyl-4-hydroxybenzylmalonate; tris(2,2,6,6-tetramethylpiperidin-4-yl) nitrilotriacetate; 1,1'-(1,2-ethanediyl)bis(3,3,5,5-tetramethylpiperazinone); 4-benzoyl-2,2,6,6-tetramethylpiperidine; 4-stearyloxy-2,2,6,6-tetramethylpiperidine; bis(1,2,2,6,6-pentamethylpiperidyl)-2-n-butyl-2-(2-hydroxy-3,5-di-tert-butylbenzyl)malonate; 3-n-octyl-7,7,9,9-tetramethyl-1,3,8-triazaspiro[4.5]decan-2,4-dione; bis(1-octyloxy-2,2,6,6-tetramethylpiperidyl)sebacate; bis(1-octyloxy-2,2,6,6-tetramethylpiperidyl)succinate; 8-acetyl-3-dodecyl-7,7,9,9-tetramethyl-1,3,8-triazaspiro[4.5]decane-2,4-dione; 3-dodecyl-1-(2,2,6,6-tetramethylpiperidin-4-yl)pyrrolidin-2,5-dione; 3-dodecyl-1-(1-ethanoyl-2,2,6,6-tetramethylpiperidin-4-yl)pyrrolidin-2,5-dione; 3-dodecyl-1-(1,2,2,6,6-pentamethylpiperidin-4-yl)pyrrolidine-2,5-dione; a mixture of 4-hexadecyloxy- and 4-stearyloxy-2,2,6,6-tetramethylpiperidine; 2-undecyl-7,7,9,9-tetramethyl-1-oxa-3,8-diaza-4-oxospiro [4. 5] decane; 1,5-dioxaspiro{5,5}undecane-3,3 -dicarboxylic acid, bis(2,2,6,6-tetramethyl-4-piperidinyl) and 1,5-dioxaspiro{5,5}undecane-3,3-dicarboxylic acid, bis(1,2,2,6,6-pentamethyl-4-piperidinyl); $N^1$-(β-hydroxyethyl)3,3-pentamethylene-5,5-dimethylpiperazin-2-one; $N^1$-tert-octyl-3,3,5,5-tetramethyl-diazepin-2-one; $N^1$-tert-octyl-3,3-pentamethylene-5,5-hexamethylene-diazepin-2-one; $N^1$-tert-octyl-3,3-pentamethylene-5,5-dimethylpiperazin-2-one; trans-1,2-cyclohexane-bis-($N^1$-5,5-dimethyl-3,3-pentamethylene-2-piperazinone; trans-1,2-cyclohexane-bis-($N^1$-3,3,5,5-dispiropentamethylene-2-piperazinone); $N^1$-isopropyl-1,4-diazadispiro-(3,3,5,5)pentamethylene-2-piperazinone; $N^1$-isopropyl-1,4-diazadispiro-3,3-pentamethylene-5,5-tetramethylene-2-piperazinone; $N^1$-isopropyl-5,5-dimethyl-3,3-pentamethylene-2-piperazinone; trans-1,2-cyclohexane-bis-$N^1$-(dimethyl-3,3-pentamethylene-2-piperazinone); $N^1$-octyl-5,5-dimethyl-3,3-pentamethylene-1,4-diazepin-2-one; and $N^1$-octyl-1,4-diazadispiro-(3,3,5,5)-pentamethylene-1,5-diazepin-2-one.

In some embodiments, the hindered amine light stabilizer comprises esters of 2,2,6,6-tetramethyl-4-piperidinol with $C_{12-21}$-saturated and $C_{18}$-unsaturated fatty acids, available as CYASORB® UV-3853S (50 wt. % concentrate with LDPE) and CYASORB® UV-3853PP5 (50 wt. % concentrate with polypropylene). The esters of 2,2,6,6-tetramethyl-4-piperidinol with $C_{12-21}$-saturated and $C_{18}$-unsaturated fatty acids can also be provided as concentrates with other thermoplastic polymers, e.g. polypropylene copolymer or styrene-acrylonitrile copolymer. In some embodiments, the hindered amine light stabilizer comprises a condensate of N,N'-bis(2,2,6,6-tetramethylpiperidin-4-yl)hexamethylenediamine and 4-morpholino-2,6-dichloro-1,3,5-triazine, available as CYASORB® UV-3346. In some embodiments, a combination of stabilizers can be used. For example, the at least one additive can be a combination of esters of 2,2,6, 6-tetramethyl-4-piperidinol with $C_{12-21}$-saturated and $C_{18}$-unsaturated fatty acids and hexadecyl 3,5-di-tert-butyl-4-hydroxybenzoate.

The "organic phosphite or phosphonite" is chosen from: a compound according to Formulas 1-7

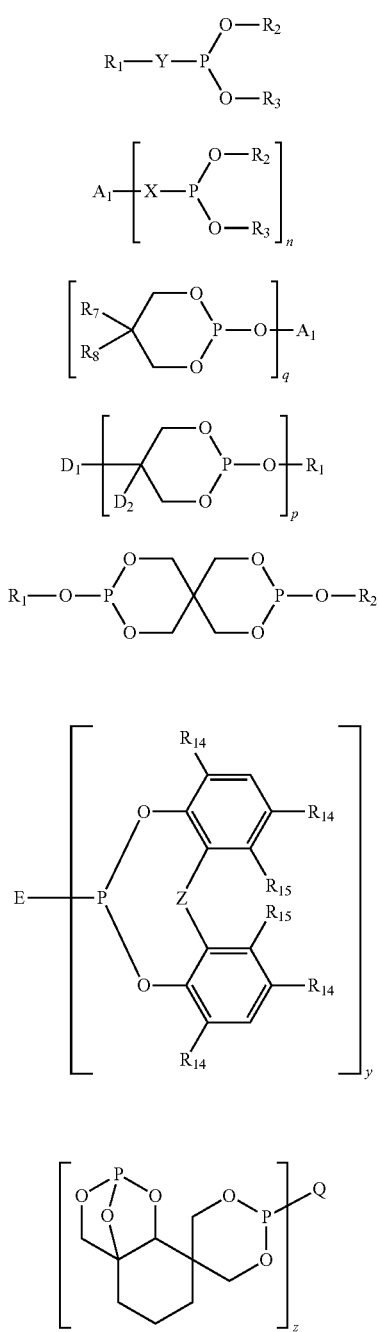

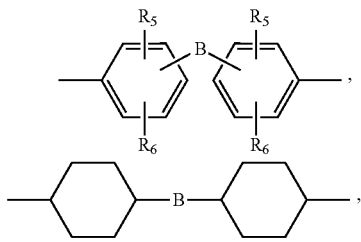

or phenylene;

$A_1$, if n is 3, is a radical of the formula $—C_rH_{2r-1}—$;

$A_1$, if n is 4, is

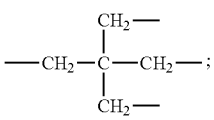

$A_2$ is as defined for $A_1$ if n is 2;

B is a direct bond, $—CH_2—$, $—CHR_4—$, $—CR_1R_4—$, sulfur, $C_5$-$C_7$ cycloalkylidene, or cyclohexylidene which is substituted by from 1 to 4 $C_1$-$C_4$ alkyl radicals in position 3, 4 and/or 5;

$D_1$, if p is 1, is $C_1$-$C_4$ alkyl and, if p is 2, is $—CH_2OCH_2—$;

$D_2$, if p is 1, is $C_1$-$C_4$ alkyl;

E, if y is 1, is $C_1$-$C_{18}$ alkyl, $—OR_1$ or halogen;

E, if y is 2, is $—O$-$A_2$-$O—$,

E, if y is 3, is a radical of the formula $R_4C(CH_2O—)_3$ or $N(CH_2CH_2O—)_3$;

Q is the radical of an at least z-valent alcohol or phenol, this radical being attached via the oxygen atom to the phosphorus atom;

$R_1$, $R_2$ and $R_3$ independently of one another are $C_1$-$C_{18}$ alkyl which is unsubstituted or substituted by halogen, $—COOR_4$, $—CN$ or $—CONR_4R_4$; $C_2$-$C_{18}$ alkyl interrupted by oxygen, sulfur or $—NR_4—$; $C_7$-$C_9$ phenylalkyl; $C_5$-$C_{12}$ cycloalkyl, phenyl or naphthyl; naphthyl or phenyl substituted by halogen, 1 to 3 alkyl radicals or alkoxy radicals having a total of 1 to 18 carbon atoms or by $C_7$-$C_9$ phenylalkyl; or a radical of the formula (III)

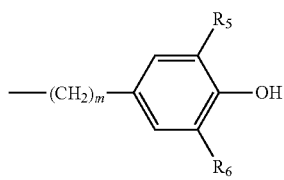

in which m is an integer from the range 3 to 6;

$R_4$ is hydrogen, $C_1$-$C_8$ alkyl, $C_5$-$C_{12}$ cycloalkyl or $C_7$-$C_9$ phenylalkyl, $R_5$ and $R_6$ independently of one another are hydrogen, $C_1$-$C_8$ alkyl or $C_5$-$C_6$ cycloalkyl, $R_7$ and $R_8$, if q is 2, independently of one another are $C_1$-$C_4$ alkyl or together are a 2,3-dehydropentamethylene radical; and $R_7$ and $R_8$, if q is 3, are methyl;

$R_{14}$ is hydrogen, $C_1$-$C_9$ alkyl or cyclohexyl, in which:

the indices are integral and n is 2, 3 or 4; p is 1 or 2; q is 2 or 3; r is 4 to 12; y is 1, 2 or 3; and z is 1 to 6;

$A_1$, if n is 2, is $C_2$-$C_{18}$ alkylene; $C_2$-$C_{12}$ alkylene interrupted by oxygen, sulfur or $—NR_4—$; a radical of the formula $R_{15}$ is hydrogen or methyl and, if two or more radicals $R_{14}$ and $R_{15}$ are present, these radicals are identical or different, X and Y are each a direct bond or oxygen, Z is a direct bond, methylene, $-C(R_{16})_2-$ or sulfur, and $R_{16}$ is $C_1$-$C_8$ alkyl; and a trisarylphosphite according to Formula (8):

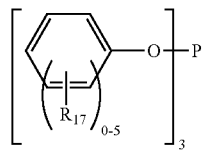

(8)

wherein $R_{17}$ is a substituent that is the same or different at from 0 to 5 positions of the aromatic portion of Formula (8) and is independently chosen from a member selected from the group consisting of $C_1$-$C_{20}$ alkyl, $C_3$-$C_{20}$ cycloalkyl, $C_4$-$C_{20}$ alkyl cycloalkyl, $C_6$-$C_{10}$ aryl, and $C_7$-$C_{20}$ alkylaryl; and combinations thereof.

Preferably, the organic phosphite or phosphonite is chosen from: triphenyl phosphite; diphenyl alkyl phosphites; phenyl dialkyl phosphites; trilauryl phosphite; trioctadecyl phosphite; distearyl pentaerythritol phosphite; tris(2,4-di-tert-butylphenyl) phosphite; tris(nonylphenyl) phosphite; a compound of formulae (A), (B), (C), (D), (E), (F), (G), (H), (J), (K) and (L):

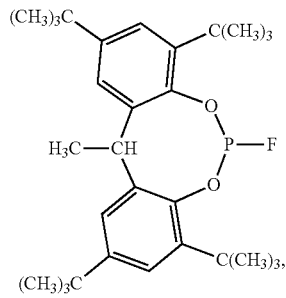
(A)

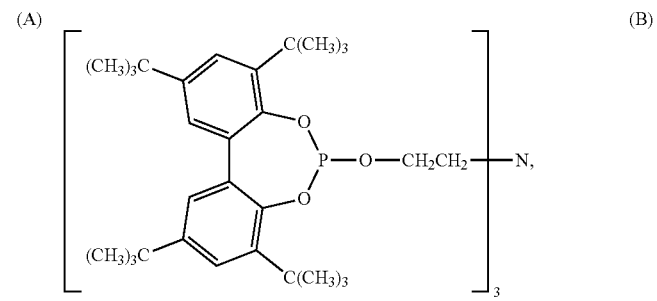
(B)

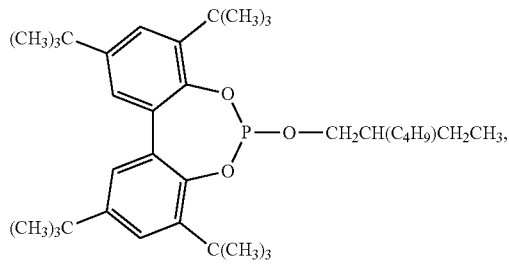
(C)

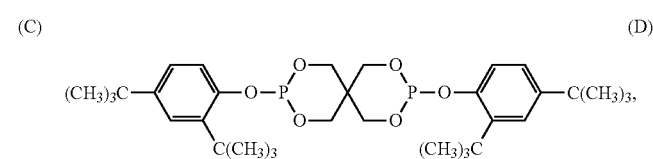
(D)

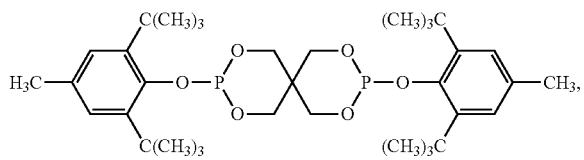
(E)

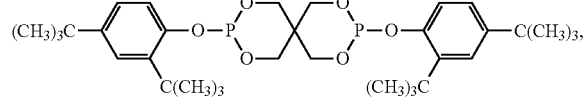
(F)

(G)

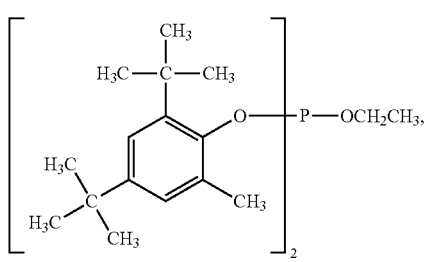

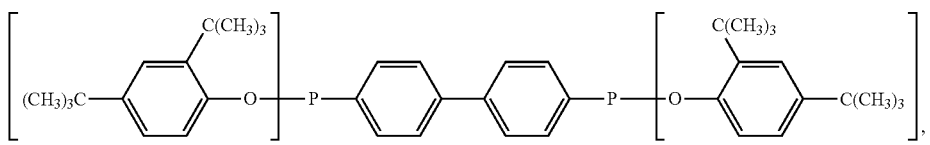
(H)

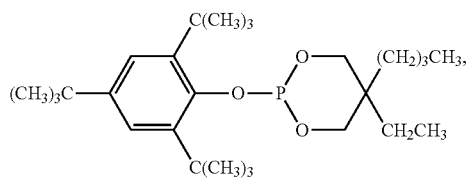
(J)

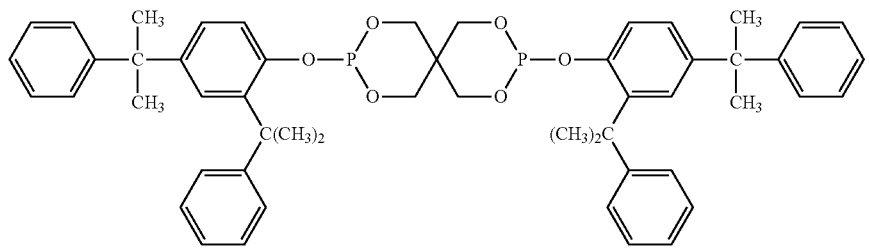
(K)

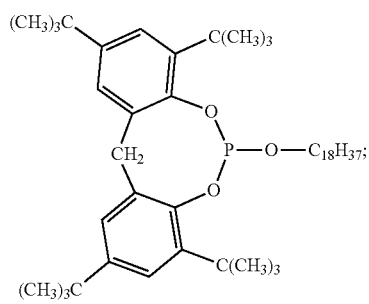
(L)

2-butyl-2-ethyl-1,3-propanediol 2,4,6-tri-tert-butylphenol phosphite, bis-(2,6-di-tert-butyl-4-methlphenyl) pentaerythritol diphosphite, 2-butyl-2-ethyl-1,3-propanediol 2,4-dicumylphenol phosphite, 2-butyl-2-ethyl-1,3-propanediol 4-methyl-2,6-di-tert-butylphenol phosphite, and bis-(2,4,6-tri-tert-butyl-phenyl) pentaerythritol diphosphite.

More preferably, at least one organic phosphite or phosphonite is chosen from tris(2,4-di-tert-butylphenyl)phosphite (IRGAFOS® 168); bis(2,4-dicumylphenyl)pentaerythritol diphosphite (DOVERPHOS® S9228); and tetrakis(2,4-di-tert-butylphenyl)4,4'-biphenylene-diphosphonite (IRGAFOS® P-EPQ).

The "hindered phenol" compound comprises a molecular fragment according to one or more of Formula (IVa), (IVb), or (IVc):

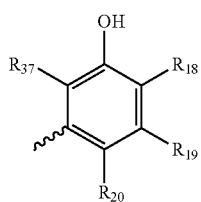
(IVa)

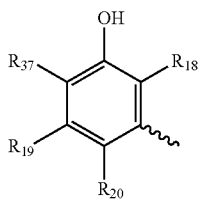
(IVb)

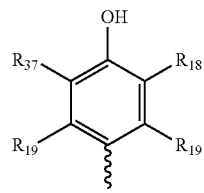
(IVc)

wherein:

$R_{18}$ is chosen from hydrogen or a $C_{1-4}$ hydrocarbyl;

each of $R_{19}$ and $R_{20}$ is independently chosen from hydrogen or a $C_1$-$C_{20}$ hydrocarbyl; and $R_{37}$ is chosen from a $C_1$-$C_{12}$ hydrocarbyl.

Preferred hindered phenols are wherein each of $R_{18}$ and $R_{37}$ is independently chosen from methyl or tert-butyl. More preferably, at least one hindered phenol compound is chosen from a member selected from the group consisting of (1,3,5-tris(4-tert-butyl-3-hydroxy-2,6-dimethylbenzyl)-1,3,5-triazine-2,4,6-(1H,3H,5H)-trione; 1,1,3-tris(2'-methyl-4'-hydroxy-5'-tert-butylphenyl)butane; triethylene glycol bis [3-(3-tert-butyl-4-hydroxy-5-methylphenyl)propionate]; 4,4'-thiobis(2-tert-butyl-5-methylphenol); 2,2'-thiodiethylene bis[3-(3-t-butyl-4-hydroxyl-5-methylphenyl)propionate]; octadecyl 3-(3'-tert-butyl-4'-hydroxy-5'-methylphenyl)propionate; tetrakismethylene(3-tert-butyl-4-hydroxy-5-methylhydrocinnamate)methane; N,N-hexamethylene bis [3-(3-tert-butyl-4-hydroxy-5-methylphenyl)propionamide]; di(4-tert-butyl-3-hydroxy-2,6-dimethyl benzyl) thiodipropionate; and octadecyl 3,5-di-tert-butyl-4-hydroxyhydrocinnamate.

The "chromane" useful in this invention are chosen from compounds of Formula (V):

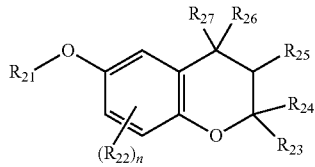

(V)

wherein:

$R_{21}$ is chosen from —$COR_{28}$ or —$Si(R_{29})_3$, wherein $R_{28}$ is chosen from H or a $C_1$-$C_{20}$ hydrocarbyl; and $R_{29}$ is chosen from a $C_1$-$C_{12}$ hydrocarbyl or alkoxy;

$R_{22}$ is a substituent that can be the same or different at from n=0 to 3 positions of the aromatic portion of Formula V and is independently chosen from H or a $C_1$-$C_{12}$ hydrocarbyl;

$R_{23}$ is chosen from H or a $C_1$-$C_{12}$ hydrocarbyl;

$R_{24}$ is chosen from H or a $C_1$-$C_{20}$ hydrocarbyl;

each of $R_{25}$-$R_{27}$ is independently chosen from a member selected from the group consisting of H; a $C_1$-$C_{12}$ hydrocarbyl; and —$OR_{30}$, wherein $R_{30}$ is chosen from H or a $C_1$-$C_{12}$ hydrocarbyl; and $R_{27}$ is H, or a bond which together with $R_{26}$ forms=O.

Preferably, the compound of Formula (V) is tocopherol compound chosen from a member selected from the group consisting of α-tocopherol, β-tocopherol, γ-tocopherol, δ-tocopherol, isomers thereof, related tocotrienols, and mixtures thereof.

Yet another preferred chromane is vitamin E acetate according to Formula (VI):

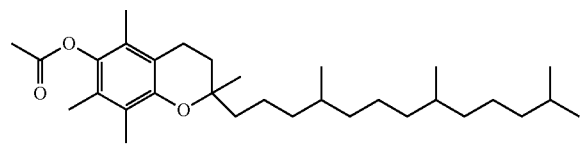

(VI)

or isomers and/or mixtures thereof.

The "ultraviolet light (UV) absorber" is chosen from a member selected from the group consisting of a 2-hydroxybenzophenone, a 2-(2'-hydroxyphenyl)benzotriazole, a 2-(2'-hydroxyphenyl)-1,3,5-triazine, a benzoxazinone, an oxamide, an oxanilide, and a combination comprising at least one of the foregoing.

In one preferred embodiment, the ultraviolet light absorber 2-(2'-hydroxyphenyl)-1,3,5-triazine compound according to Formula (VII):

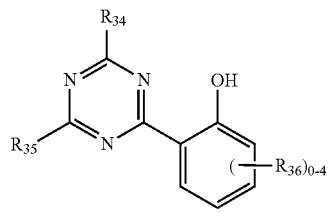

(VII)

wherein:

each of $R_{34}$ and $R_{35}$ is independently chosen from a member selected from the group consisting of an optionally substituted $C_6$-$C_{10}$ aryl group, a $C_1$-$C_{10}$ hydrocarbyl-substituted amino, a $C_1$-$C_{10}$ acyl and a $C_1$-$C_{10}$ alkoxyl; and $R_{36}$ is a substituent that is the same or different at from 0 to 4 positions of the phenoxy portion of Formula VII and in each instance is independently chosen from a member selected from the group consisting of hydroxyl, a $C_1$-$C_{12}$ hydrocarbyl, a $C_1$-$C_{12}$ alkoxyl, a $C_1$-$C_{12}$ alkoxyester, and a $C_1$-$C_{12}$ acyl.

Preferably, the 2-(2'-hydroxyphenyl)-1,3,5-triazine compound is chosen from a member selected from the group consisting of 4,6-bis-(2,4-dimethylphenyl)-2-(2-hydroxy-4-octyloxyphenyl)-s-triazine (CYASORB® 1164 available from Cytec (Solvay Group)); 4,6-bis-(2,4-dimethylphenyl)-2-(2,4-dihydroxyphenyl)-s-triazine; 2,4-bis(2,4-dihydroxyphenyl)-6-(4-chlorophenyl)-s-triazine; 2,4-bis[2-hydroxy-4-(2-hydroxy-ethoxy)phenyl]-6-(4-chlorophenyl)-s-triazine; 2,4-bis[2-hydroxy-4-(2-hydroxy-4-(2-hydroxy-ethoxy)phenyl]-6-(2,4-dimethylphenyl)-s-triazine; 2,4-bis[2-hydroxy-4-(2-hydroxyethoxy)phenyl]-6-(4-bromophenyl)-s-triazine; 2,4-bis[2-hydroxy-4-(2-acetoxyethoxy)phenyl]-6-(4-chlorophenyl)-s-triazine; 2,4-bis(2,4-dihydroxyphenyl)-6-(2,4-dimethylphenyl)-s-triazine; 2,4-bis(4-biphenylyl)-6-[2-hydroxy-4-[(octyloxycarbonyl)ethylideneoxy]phenyl]-s-triazine; 2,4-bis(4-biphenylyl)-6-[2-hydroxy-4-(2-ethylhexyloxy)phenyl]-s-triazine; 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine; 2,4-bis(2,4-dimethylphenyl)-6-[2-hydroxy-4(-3-benzyloxy-2-hydroxypropyloxy)phenyl]-s-triazine; 2,4-bis(2-hydroxy-4-n-butyloxyphenyl)-6-(2, 4-di-n-butyloxyphenyl)-s-triazine; 2,4-bis(2,4-dimethylphenyl)-6-[2-hydroxy-4-(3-nonyloxy-2-hydroxypropylox-y)-5-α-cumylphenyl]-s-triazine; methylenebis-{2,4-bis(2,4-dimethylphenyl)-6-[2-hydroxy-4-(3-butyloxy-2-hydroxypropoxy)phenyl]-s-triazine}; methylene bridged dimer mixture bridged in the 3:5', 5:5' and 3:3' positions in a 5:4:1 ratio; 2,4,6-tris(2-hydroxy-4-isooctyloxycarbonyliso-propylideneoxy-phenyl)-s-triazine; 2,4-bis(2,4-dimethylphenyl)-6-(2-hydroxy-4-hexyloxy-5-α-cumylphenyl)-s-triazine; 2-(2,4,6-trimethylphenyl)-4,6-bis[2-hydroxy-4-(3-butyloxy-2-hydroxypropyloxy)phenyl]-s-triazine; 2,4,6-tris[2-hydroxy-4-(3-sec-butyloxy-2-hydroxypropyloxy)-phenyl]-s-triazine; mixture of 4,6-bis-(2,4-dimethylphenyl)-2-(2-hydroxy-4-(3-dodecyloxy-2-hydroxypropoxy)phenyl)-s-triazine and 4,6-bis-(2,4-dimethylphenyl)-2-(2-hydroxy-4-(3-tridecyloxy-2-hydroxypropoxy)phenyl)-s-triazine (TINUVIN® 400 available from BASF); 4,6-bis-(2,4-dimethylphenyl)-2-(2-hydroxy-4(3-(2-ethylhexyloxy)-2-hydroxypropoxy)-phenyl)-s-triazine; 4,6-diphenyl-2-(4-hexyloxy-2-hydroxyphenyl)-s-triazine; and combinations thereof.

In another preferred embodiment, the ultraviolet light absorber 2-(2'-hydroxyphenyl)benzotriazole is selected from: 2-(2'-hydroxy-5'-methylphenyl)-benzotriazole; 2-(3', 5'-di-tert-butyl-2'-hydroxyphenyl)benzotriazole; 2-(5'-tert-butyl-2'-hydroxyphenyl)benzotriazole; 2-(2'-hydroxy-5'-(1, 1,3,3-tetramethylbutyl)phenyl)benzotriazole; 2-(3',5'-di-tert-butyl-2'-hydroxyphenyl)-5-chloro-benzotriazole; 2-(3'-tert-butyl-2'-hydroxy-5'-methylphenyl)-5-chloro-benzotriazole; 2-(3'-sec-butyl-5 '-tert-butyl-2'-hydroxyphenyl)benzotriazole; 2-(2'-hydroxy-4'-octyloxyphenyl)benzotriazole; 2-(3',5'-di-tert-amyl-2'-hydroxyphenyl)benzotriazole; 2-(3',5'-bis-(α,α-dimethylbenzyl)-2'-hydroxyphenyl)benzotriazole; 2-(3'-tertbutyl-2'-hydroxy-5'-(2-octyloxycarbonylethyl)phenyl)-5-chloro-benzotriazole; 2-(3'-tert-butyl-5'-[2-(2-ethylhexyloxy)-carbonylethyl]-2'-hydroxyphenyl)-5-chloro-benzotriazole; 2-(3'-tert-butyl-2'-hydroxy-5'-(2-methoxycarbonylethyl)phenyl)-5-chloro-benzotriazole; 2-(3'-tert-butyl-2'-hydroxy-5'-(2-methoxycarbonylethyl)phenyl)benzotriazole; 2-(3'-tert-butyl-2'-hydroxy-5'-(2-octyloxycarbonylethyl)phenyl)benzotriazole; 2-(3'-tert-butyl-5'-[2-(2-ethylhexyloxy)carbonyl]-2'-hydroxyphenyl)benzotriazole; 2-(3'-dodecyl-2'-hydroxy-5'-methylphenyl)benzotriazole; 2-(3'-tert-butyl-2'-hydroxy-5'-(2-isooctyloxycarbonylethyl)phenylbenzotriazole; 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$]$_2$ where R is 3'-tert-butyl-4'-hydroxy-5'-2H-benzotriazol-2-ylphenyl; 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole; and mixtures thereof.

In yet another aspect, the ultraviolet light absorber 2-hydroxybenzophenone is selected from 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives of 2-hydroxybenzophenone; and mixtures thereof.

The "hindered benzoate" used in this invention is a compound selected from 4-tert-butyl-phenyl salicylate, phenyl salicylate, octylphenyl salicylate, dibenzoyl resorcinol, bis(4-tert-butylbenzoy)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate; and a mixture thereof. In some embodiments, the hindered benzoate comprises hexadecyl 3,5-di-tert-butyl-4-hydroxybenzoate, available from Cytec (Solvay Group) as CYASORB® UV-2908.

The "hydroxylamine" class of stabilizers useful in this invention comprises at least one compound chosen from a member selected from the group consisting of:

a hydroxylamine compound according to Formula (VIII)

(VIII)

wherein: T$_1$ is chosen from a member selected from the group consisting of an optionally substituted C$_1$-C$_{36}$ hydrocarbyl, an optionally substituted C$_5$-C$_{12}$ cycloalkyl, and an optionally substituted C$_7$-C$_9$ aralkyl; and T$_2$ is chosen from hydrogen or T$_1$; and a tertiary amine oxide compound according to Formula (IX)

(IX)

wherein:

each of W$_1$ and W$_2$ is independently chosen from a C$_6$-C$_{36}$ hydrocarbyl chosen from a member selected from the group consisting of a straight or branched chain C$_6$-C$_{36}$ alkyl, a C$_6$-C$_{12}$ aryl, a C$_7$-C$_{36}$ aralkyl, a C$_7$-C$_{36}$ alkaryl, a C$_5$-C$_{36}$ cycloalkyl, a C$_6$-C$_{36}$ alkcycloalkyl; and a C$_6$-C$_{36}$ cycloalkylalkyl;

W$_3$ is chosen from a C$_1$-C$_{36}$ hydrocarbyl chosen from a member selected from the group consisting of a straight or branched chain C$_1$-C$_{36}$ alkyl, a C$_6$-C$_{12}$ aryl, a C$_7$-C$_{36}$ aralkyl, a C$_7$-C$_{36}$ alkaryl, a C$_5$-C$_{36}$ cycloalkyl, a C$_6$-C$_{36}$ alkcycloalkyl; and a C$_6$-C$_{36}$ cycloalkylalkyl;

with the proviso that at least one of W$_1$, W$_2$ and W$_3$ contains a β carbon-hydrogen bond;

wherein said alkyl, aralkyl, alkaryl, cycloalkyl, alkcycloalkyl and cycloalkylalkyl groups may be interrupted by one to sixteen groups chosen from a member selected from the group consisting of —O—, —S—, —SO—, —SO$_2$—, —COO, —OCO—, —CO—, NW$_4$—, —CONW$_4$— and —NW$_4$CO—, or wherein said alkyl, aralkyl, alkaryl, cycloalkyl, alkcycloalkyl and cycloalkylallyl groups may be substituted by one to sixteen groups chosen from a member selected from the group consisting of —OW$_4$, —SW$_4$, —COOW$_4$, —OCOW$_4$, —COW$_4$, —N(W$_4$)$_2$, —CON(W$_4$)$_2$, —NW$_4$COW$_4$ and 5- and 6-membered rings containing the group —C(CH$_3$)(CH$_2$R$_x$)NL(CH$_2$R$_x$)(CH$_3$)C—, or wherein said alkyl, aralkyl, alkaryl, cycloalkyl, alkcycloalkyl and cycloalkylalkyl groups are both interrupted and substituted by the groups mentioned above;

wherein:

W$_4$ is chosen from hydrogen or a C$_1$-C$_8$ alkyl;

R$_x$ is chosen from hydrogen or methyl; and

L is chosen from a C$_1$-C$_{30}$ alkyl; a —C(O)R moiety, or a —OR moiety, wherein R is a C$_1$-C$_{30}$ straight or branched chain alkyl group; and wherein said aryl groups may be substituted by a member selected from the group consisting of one to three halogen groups, a C$_1$-C$_8$ alkyl group, a C$_1$-C$_8$ alkoxy group, and combinations thereof.

Preferred "hydroxylamine" stabilizer composition according to Formula (VIII) is a N,N-dihydrocarbylhydroxylamine wherein each of T$_1$ and T$_2$ is independently chosen from a member selected from the group consisting of benzyl, ethyl, octyl, lauryl, dodecyl, tetradecyl, hexadecyl, heptadecyl and octadecyl; or wherein each of T$_1$ and T$_2$ is the alkyl mixture found in hydrogenated tallow amine.

More preferably, the compound according to Formula (VIII) is a N,N-dihydrocarbylhydroxylamine chosen from a member selected from the group consisting of N,N-dibenzylhydroxylamine; N,N-diethylhydroxylamine; N,N-dioctylhydroxylamine; N,N-dilaurylhydroxylamine; N,N-didodecylhydroxylamine; N,N-ditetradecylhydroxylaamine; N,N-dihexadecylhydroxylamine; N,N-dioctadecylhydroxylamine; N-hexadecyl-N-tetradecylhydroxylamine; N-hexadecyl-N-heptadecylhydroxylamine; N-hexadecyl-N-octadecylhydroxylamine; N-heptadecyl-N-octadecylhydroxylamine; and N,N-di(hydrogenated tallow) hydroxylamine.

Another aspect of this invention is to provide resin masterbatch compositions comprising a free radical polymerization inhibitor. During the manufacture, distillation/purification and storage/transport of ethylenically unsaturated monomers, it is common practice to incorporate a monomer stabilizer (i.e. free radical inhibitor). These inhibitors are designed to prevent the premature polymerization of these monomers, allowing the monomers to be manufactured, distilled, otherwise purified, and stored until such time the monomer is converted to a useful polymer under controlled polymerization conditions. Examples of ethylenically unsaturated monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_{1-40}$ alkyl esters of (meth)acrylic acid; for example, methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, lauryl (meth) acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, and tri-alkyl esters of ethylenically unsaturated di- and tri-carboxylic acids and anhydrides, such as ethyl maleate, dimethyl fumarate, trimethyl aconitate, and ethyl methyl itaconate; carboxylic acid-functional monomers such as (meth)acrylic acid, itaconic acid, fumaric acid, and maleic acid, and acid chloride derivatives of carboxylic acid-functional monomers, such as (meth)acryloyl chloride. The ethylenically unsaturated monomer can also be a phosphate-, phosphinate-, or phosphonite-functional monomer, for example 2-phosphoethyl (meth)acrylate. The ethylenically unsaturated monomer can also be a multi-ethylenically unsaturated monomer. Examples of multi-ethylenically unsaturated monomers include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene. In some embodiments, the ethylenically unsaturated monomer comprises at least one of methyl (meth)acrylate, ethyl (meth)acrylate, butyl (meth)acrylate, 2-ethylhexyl (meth)acrylate, acrylonitrile, vinyl acetate, acrolein, butadiene, styrene, and chloroprene.

Polymerization inhibitors are utilized singly or in combination in monomer manufacturing processes. The inhibitor is dissolved into a suitable process solvent or the monomer itself in a blend (i.e. mix) tank. The inhibitors are dissolved at 1 to 50 wt. %, depending upon solubility, to form concentrates. The concentrates are then charged to a process stream to provide an end-use concentration of 10 to 10,000 ppm.

Polymerization inhibitors are charged individually to mix tanks. Thus multiple additions can be required for multiple inhibitors. Inhibitors are supplied as fine powders, flakes, pastilles, prills, or liquids. In the handling and addition of the solid forms to manufacturing process streams, pneumatic conveyance, screw and table feeders, augers, rotary valves, or other mechanical devices are utilized. Utilizing these devices can lead to inhibitor attrition, caking, and clumping. Inhibitor can also cake and clump during storage in its original package or in a storage silo. These operational issues are potential sources of productivity losses. Also, charging the inhibitor to mixing systems can require worker handling, which can result in exposure to the potentially harmful chemical effects of the inhibitor chemical. Inhibitors in the form of fine powders can be a dust explosion hazard.

Thus, there is a need for polymerization inhibitors having improved handling properties, i.e. that and are not prone to product attrition, breakdown, caking, or clumping. Also, providing combinations of inhibitors in single pellets rather than having to handle and add them to process streams separately would simplify monomer production and storage operations.

Examples of polymerization inhibitors include phenothiazine (PTZ) and its derivatives, dihydroxybenzenes (e.g. hydroquinone (HQ), resorcinol, catechol) and their derivatives (e.g. monomethyl ether of hydroquinone (MEHQ), tert-butyl hydroquinone (TBHQ), para-benzoquinone (PBQ), butylated hydroxyanisole (BHA), butylated hydroxytoluene (BHT), tert-butyl catechol (TBC)). Other polymerization inhibitors include metal dibutyl dithiocarbamates (e.g. copper, manganese, or silver dibutyl dithiocarbamates), nitroxyl radicals (e.g. TEMPO, 4-hydroxy TEMPO, 4-acetamido TEMPO), aromatic amines (e.g. phenylene diamine, butylated diphenylamines, octylated diphenylamines, phenyl-α-methylnapthylamines), hydroxylamines (e.g. diethyl hydroxylamine), nitrosamines (e.g. para-nitrosophenol), and hindered phenols. Hydroxylamines, and hindered phenols are discussed further in preceding paragraphs. In some embodiments, the polymerization inhibitor comprises at least one of phenothiazine, a phenothiazine derivative, hydroquinone, monomethyl ether of hydroquinone (MEHQ), and tert-butyl catechol (TBC). In some embodiments, the polymerization inhibitor comprises phenothiazine (PTZ).

Another aspect of this invention is to provide closed end pellets where the core comprises at least one metal extractant.

In some embodiments, in addition to a stabilizer, the core further comprises a diluent polymer. The diluent polymer is the same or different than the polymer of the outer layer. In some embodiments, in addition to the polymer, the outer layer further comprises at least one stabilizer. The at least one stabilizer of the outer layer can be the same or different than the at least one stabilizer of the core.

A process for producing the resin masterbatch composition comprises: co-extruding in tubular form a core material encapsulated by an outer layer, wherein the core material comprises at least one additive, and the outer layer comprises a polymer, to form a filled tube; passing the filled tube into a sealing device that cuts the filled tube into multiple discrete segments seals and simultaneously seals each end of each discrete segment, thereby forming closed end pellets; and cooling the closed end pellets. The process is described in further detail in Example 1 below, which includes a description of the extrusion head depicted in FIG. 6 and used to co-extrude the core material and outer layer. In some embodiments, at least two filled tubes are simultaneously extruded, cut, sealed, and cooled with the same device, to form at least two process streams of closed end pellets.

The resin masterbatch compositions can advantageously be used to stabilize a wide variety of organic materials. Thus, a stabilized composition is prepared from an organic material to be stabilized, and the resin masterbatch composition. In some embodiments, the organic material comprises a polymer, a coating, a molded article, a fiber, a textile, a film, an ethylenically unsaturated monomer, a wax, an organic compound, a photographic film, paper, a cosmetic, an organic dye, or an ink. Examples of coatings include solvent-borne coatings, water-borne coatings, and powder coatings.

In some embodiments, the organic material is a polymer. Examples of polymers include polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, polystyrenes, acrylonitrile-butadiene-styrene terpolymers, styrene-acrylonitrile copolymers, acrylate-styrene-acrylonitrile terpolymers, cellulosic acetate butyrate, cellulosic polymers, polyimides, polyamideimides, polyetherimides, polyphenylsulfides, polyphenylene oxides, polysulfones, polyethersulfones, polyvinyl chlorides, polycarbonates, thermoplastic olefins, amino resin cross-linked polyacrylates and polyesters, polyisocyanate cross-linked polyesters and polyacrylates, phenol/formaldehyde, urea/formaldehyde and melamine/formaldehyde resins, drying and non-drying alkyd resins, alkyd resins, polyester resins, acrylate resins cross-linked with melamine resins, urea resins, isocyanates, isocyanurates, carbamates, epoxy resins, cross-linked epoxy resins derived from aliphatic, cycloaliphatic, heterocyclic and aromatic glycidyl compounds, which are cross-linked with anhydrides or amines, polysiloxanes, Michael addition polymers, amines, blocked amines with activated unsaturated and methylene compounds, ketimines with activated unsaturated and methylene compounds, polyketimines in combination with unsaturated acrylic polyacetoacetate resins, polyketimines in combination with unsaturated acrylic resins, radiation curable compositions, epoxy melamine resins, and a combination comprising at least one of the foregoing polymers.

In some embodiments, the polymer is a polyolefin. The polyolefin can be: i) polymers of monoolefins chosen from polypropylene, polyisobutylene, polybut-1-ene, poly-4-methylpent-1-ene; ii) diolefins chosen from polyisoprene or polybutadiene; iii) polymers of cycloolefins chosen from cyclopentene, and norbornene; iv) polyethylene chosen from optionally crosslinked polyethylene, high density polyethylene (HDPE), high density and high molecular weight polyethylene (HDPE-HMW), high density and ultrahigh molecular weight polyethylene (HDPE-UHMW), medium density polyethylene (HDPE), low density polyethylene (LDPE), linear low density polyethylene (LLDPE), very low density polyethylene (VLDPE), and ultralow density polyethylene (ULDPE); v) copolymers thereof; or vi) mixtures comprising at least one of the foregoing polyolefins.

The stabilized composition comprises from 0.001% to 75% by weight of stabilizer, based on the total weight of the stabilizer composition. Within this range, the stabilized composition can comprise from 0.01% to 65% by weight, from 0.01% to 50% by weight, from 0.01% to 25% by weight, from 0.01% to 15% by weight, from 0.05% to 10% by weight, or from 0.05% to 5 wt. % of stabilizer, based on the total weight of the stabilized composition.

In addition to the organic material to be stabilized and the resin masterbatch composition, the stabilized composition can further include conventional additives including, but not limited to, metal deactivators, nitrones, lactones, co-stabilizers, nucleating agents, clarifying agents, neutralizers, metal stearates, metal oxides, hydrotalcites, fillers and reinforcing agents, plasticizers, lubricants, emulsifiers, pigments, rheological additives, catalysts, level agents, optical brighteners, flame retardants, anti-static agents, and blowing agents.

The resin masterbatch composition can be used to provide a stabilized composition. The stabilized composition can in turn be used in a variety of articles, including, but not limited to, automotive components, geomembranes, agricultural films, and solar panels. Examples of geomembranes include pond liners, ground covers, underlayment, water barriers, erosion control membranes, and the like. The stabilized compositions can also be used in any other article that could benefit from thermal and/or UV stabilization.

Another aspect of this invention is a process for producing an article, the process comprising melt-mixing the resin masterbatch composition with the polymer to form a stabilized composition; and molding the stabilized composition to form the molded article. The melt-mixing can be done in a kneading apparatus such as a single or twin screw extruder, Banbury mixer, or hot rollers. The molding can be injection molding, rotomolding, blow molding, reel-to-reel molding, metal injection molding, compression molding, transfer molding, dip molding, gas assist molding, insert injection molding, micro molding, reaction injection molding, and two shot injection molding.

This invention includes at least the following embodiments.

Embodiment 1. A resin masterbatch composition provided as closed end pellets comprising a core and an outer layer encapsulating said core, wherein the core comprises at least one additive, and the outer layer comprises a polymer, characterized in that the thickness of the outer layer is from 0.001 mm to 1 cm.

Embodiment 2. The resin masterbatch composition as defined in embodiment 1, wherein the at least one additive comprises a stabilizer.

Embodiment 3. The resin masterbatch composition as defined in embodiment 2, wherein the stabilizer comprises at least one of a hindered amine light stabilizers (HALS), an organic phosphite or phosphonite, a hindered phenol, a chromane, an ultraviolet light (UV) absorber, a hindered benzoate, a hydroxylamine, a tertiary amine oxide, and a free radical polymerization inhibitor.

Embodiment 4. The resin masterbatch composition as defined in embodiment 2, wherein the stabilizer comprises esters of 2,2,6,6-tetramethyl-4-piperidinol with $C_{12\text{-}21}$-saturated and $C_{18}$-unsaturated fatty acids.

Embodiment 5. The resin masterbatch composition as defined in embodiment 2, wherein the stabilizer comprises at least one of phenothiazine, a phenothiazine derivative, hydroquinone, and hydroquinone monomethyl ether (MEHQ).

Embodiment 6. The resin masterbatch composition defined in any of embodiments 1-5, wherein the polymer is a thermoplastic polymer.

Embodiment 7. The resin masterbatch composition as defined in embodiment 6, wherein the thermoplastic polymer comprises at least one of: polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, acrylonitrile-butadiene-styrene terpolymers, styrene-acrylonitrile copolymers, acrylate-styrene-acrylonitrile terpolymers, cellulosic acetate butyrate, cellulosic polymers, polyimides, polyamideimides, polyetherimides, polyphenylene sulfides, polyphenylene oxides, polysulfones, polyethersulfones, polyvinyl chlorides, polycarbonates, and ethylene-vinyl acetate copolymers.

Embodiment 8. The resin masterbatch composition as defined in embodiment 6, wherein the thermoplastic polymer comprises at least one of polyethylene, polypropylene, a polypropylene copolymer, polystyrene, and a styrene-acrylonitrile copolymer.

Embodiment 9. The resin masterbatch composition as defined in any of embodiments 6-8, wherein the core further comprises a thermoplastic polymer diluent that is the same or different than the thermoplastic polymer in the outer layer.

Embodiment 10. The resin masterbatch composition as defined in any of embodiments 1-9, wherein the outer layer comprises at least one stabilizer.

Embodiment 11. A stabilized composition prepared from an organic material to be stabilized, and the resin masterbatch composition as defined in any of embodiments 1-10.

Embodiment 12. The stabilized composition as defined in embodiment 11, wherein the organic material comprises a polymer, a coating, a molded article, a textile, a fiber, a film, an ethylenically unsaturated monomer, a wax, an organic compound, a photographic film, paper, a cosmetic, an organic dye, or an ink.

Embodiment 13. The use of the resin masterbatch composition as defined in any of embodiments 1-10 to provide a stabilized composition.

Embodiment 14. A process for producing the resin masterbatch composition as defined in any of embodiments 1-10, the process comprising: co-extruding in tubular form a core material encapsulated by an outer layer, wherein the core material comprises at least one additive, and the outer layer comprises a polymer, to form a filled tube; passing the filled tube into a sealing device that cuts the filled tube into multiple discrete segments and simultaneously seals each end of each discrete segment, thereby forming closed end pellets; and cooling the closed end pellets.

Embodiment 15. The process as defined in embodiment 14, wherein at least two filled tubes are simultaneously extruded, cut, sealed, and cooled with the same device, to form at least two process streams of closed end pellets.

Embodiment 16. A process for producing an article, the process comprising melt-mixing the resin masterbatch composition of any of embodiments 1-10 with a polymer to form a stabilized composition; and molding the stabilized composition to form the molded article.

EXAMPLES

The following examples are provided to assist one skilled in the art to further understand certain embodiments. These examples are intended for illustration purposes and are not to be construed as limiting the scope of the present invention.

Figure 2:
FIG. 2—Closed end pellets (CEPs) according to the invention.
Figure 2A:
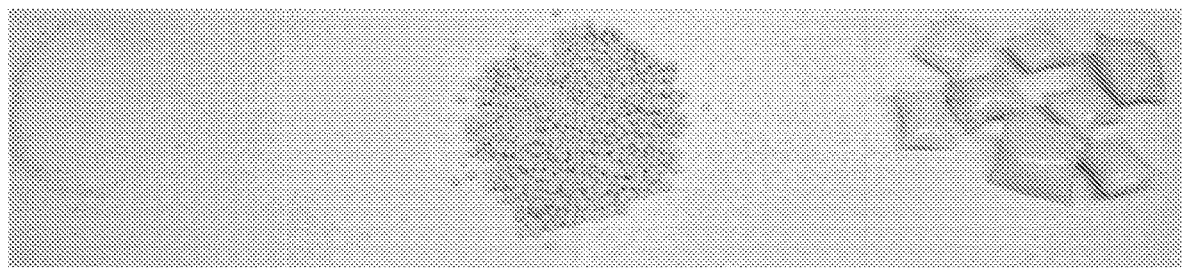
FIG. 2A—Different forms of phenothiazine, powder (left), prill (compounded in polystyrene, center), and closed end pellets (with polystyrene encapsulant, right).
Figure 2B:
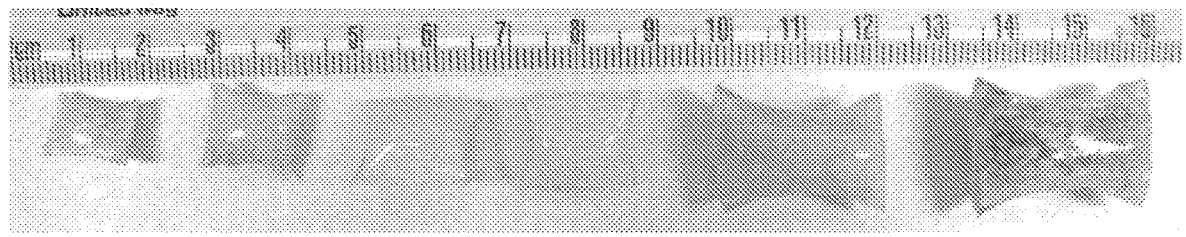
FIG. 2B—Different sizes of polystyrene-encapsulated phenothiazine (CEP).
Figure 6:
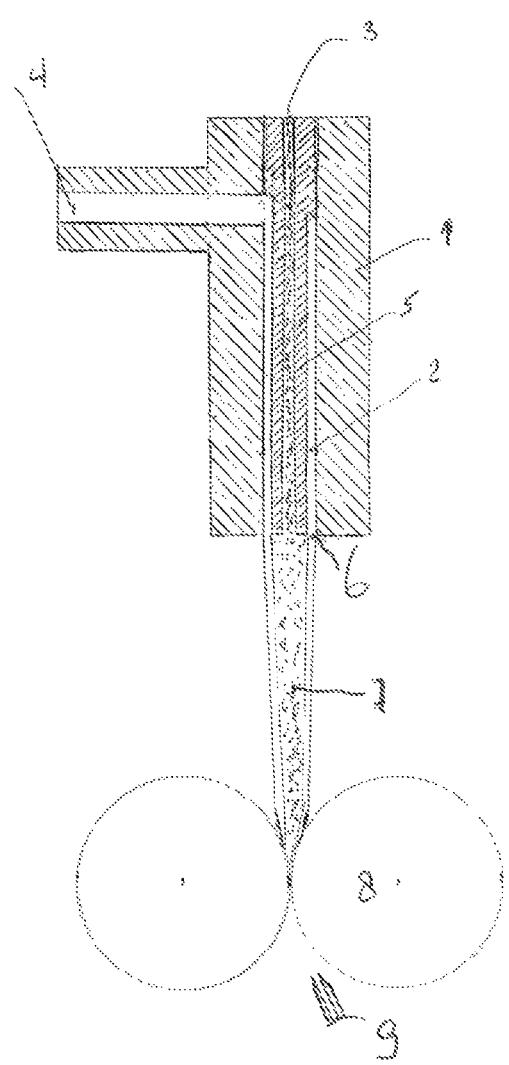
FIG. 6—Schematic diagram of an extrusion head and formation of a closed end pellet according to the invention.

Example 1: Process for manufacturing encapsulated stabilizers (CEP). Reference is made to FIG. 6, depicting an extrusion head and formation of a closed end pellet according to the invention. The outer layer provided as a polymer (e.g., polypropylene, polypropylene copolymer, polyethylene, or styrene-acrylonitrile copolymer) is charged into an extruder (outside extrusion head 1; inside extrusion head 5) via a connection to the extruder for the polymer 4, and into a channel 2 for the polymer melt. The core material provided as a stabilizer (e.g., CYASORB® UV-3853, or phenothiazine) is charged to another part of the extrusion head 1 by means of a pumping system or another extruder via connection 3. In the co-extrusion process, the extruder head 1 shapes a polymer tube 7 that is simultaneously filled with the core material at the die opening 6. The filled tube is then led into a closing device 8 for sealing and cutting. The filled tube is then simultaneously sealed at each end (closed end) of the tube and cut into multiple discrete segments to form multiple closed end pellets. The pellets are then cooled by water delivered by a water spray nozzle 9. The closed end pellets are then dried and packed. FIG. 2 depicts exemplary closed end pellets according to the invention. FIG. 2A depicts different forms of phenothiazine, powder (left), prill (compounded in polystyrene, center), and CEP (with polystyrene encapsulant, right). FIG. 2B depicts different sizes of poly- styrene-encapsulated phenothiazine (CEP). The ruler is marked in units of centimeters.

Example 2: Effect of using encapsulated stabilizers (CEP) on dispersion of stabilizers in the polymer after processing. The following experiment was designed to demonstrate the utility of encapsulated stabilizers in polymer stabilization and investigate any adverse effect of using encapsulated stabilizers (CEP) on the dispersion of stabilizers in the polymer after processing. For this experiment, two different samples of encapsulated stabilizers (CEP) were investigated along with one comparative sample of cylindrical pellets as shown in Table 1.

Equipment and material: Equipment used: Davis-Standard (Killion); Type of Resin: Polypropylene resin (Pro-fax 6301); Temperature Profile Range: 205-230° C.

Process Description: After keeping the extruder at the required processing temperature (205-230° C.) for one hour, the pelletizer, the blower and the extruder were turned on. The extruder motor speed and the pelletizer speeds were synchronized (i.e. set at approximately the same speed) so that the material flowed uniformly through the bath into the pelletizer). The extruder speed was kept at 65 rpm. The formulated resin (with stabilizers in the form of cylindrical pellets and CEPs), prepared with a target of 0.25% concentration in the polymer, was poured into the extruder's hopper funnel. After a few minutes, clean material flowed out of the die. The material coming out of the die was flown into ice water where the strands solidified. The strands were fed into the pelletizer, the extruder screw speed was adjusted to the proper rotational speed (65 rpm), and the pellets from the pelletizer unit were collected into a plastic bag.

The PP pellets were analyzed for stabilizer amount by GC/FID, and the results are shown in the Table 1, demonstrating that the target concentration is achieved with CEP technology of the instant invention, as in the comparative sample of cylindrical pellets, and no adverse effect was observed.

TABLE 1

Stabilizer Dispersion in Polypropylene

| Form | Stabilizer MB | Stabilizer Concentration (by weight) | Target Conc. in PP (by weight) | Analysis Conc. in PP (by weight) |
|---|---|---|---|---|
| Cylindrical Pellets | UV-3853PP5 | 50% active in PP | 0.25% | 0.23% |
| CEP | UV-3853PPC | 70% active in PPC | 0.25% | 0.26% |
| CEP | UV-3808PPC | 70% active in PPC | 0.25% | 0.24% |

Figure 3:
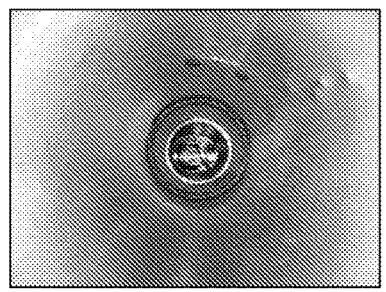
Figure 3:
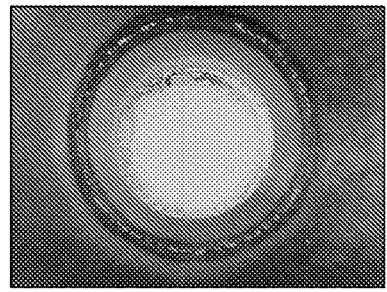
Figure 3:
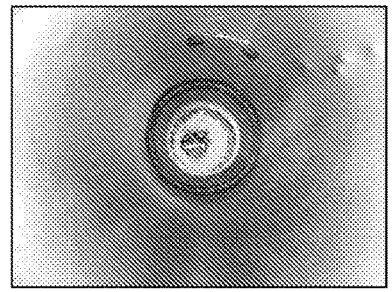
Figure 3:
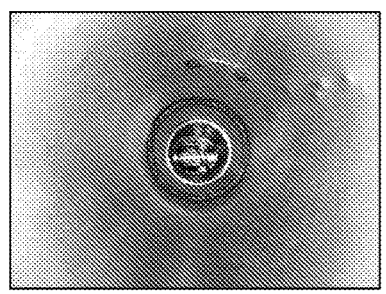
Figure 3:
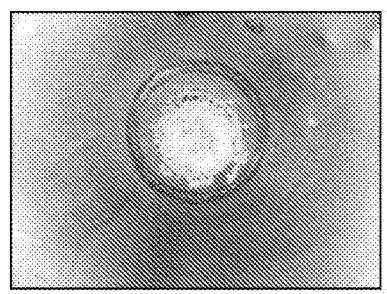
Figure 3:
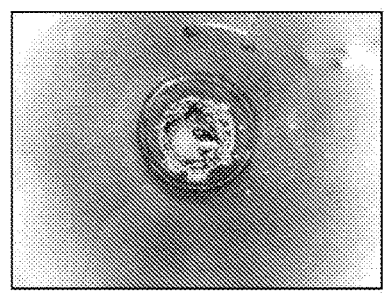
Figure 3:
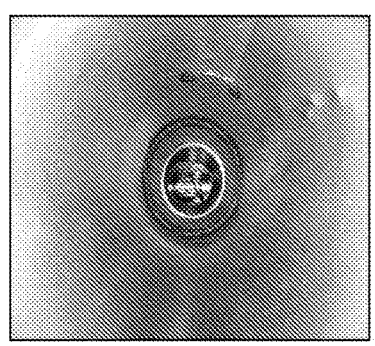
Figure 3:
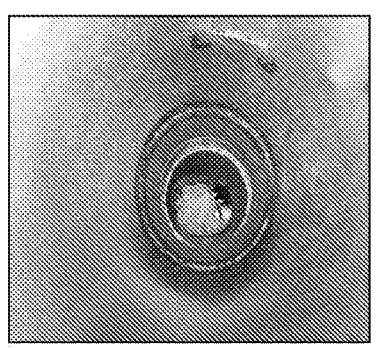
Figure 3:
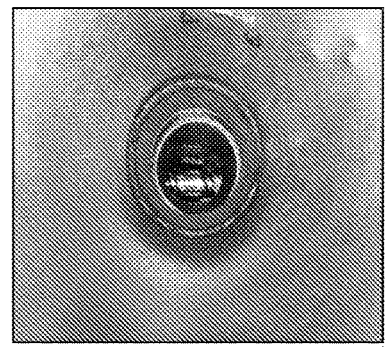

Example 3: Effect of using encapsulated stabilizers (CEP) on extruder feed-throat bridging. In this experiment, extruder feed-throat bridging simulation was done to investigate the effect on stabilizer deposit formation. As can be seen from Table 2 and FIG. 31, CEP material did not leave behind any deposits whereas the flake material and skin MB material showed deposits on the extruder screw (FIGS. 3C and 3F, respectively), thus showing a clear advantage of using CEP technology.

Equipment: Davis-Standard (Killion); temperature: 90-100° C. at the hopper; Holding time: 1 hr. (before turning the screw); Sample amount: 50-100 g; Masterbatch: UV-38535 (50% active in LDPE, flake), UV-3853PP5 (50% active in PP, cylindrical pellets), UV-3853PPC (70% active in PPC, CEPs).

The three materials, flake, cylindrical pellets, and CEPs, were charged to the hopper separately and in identical manner, and were held for 1 hr. at 90-100° C. at the hopper. The extruder screw was then turned on, and the following ratings were assigned on the deposition of any residue in the hopper or extruder screw. As is clear from Table 2 and FIGS. 3A-I, only the CEPs did not leave any deposit and worked the best.

Rating System: 1—No deposit in hopper, extruder feed-throat and extruder screw; 2—Minor deposit in hopper, extruder feed-throat, and extruder screw; 3—Some deposit in hopper, extruder feed-throat, and extruder screw; 4—Significant deposit in hopper, extruder feed-throat, and extruder screw. Results are shown in Table 2 below.

TABLE 2

Extruder Feed-throat Bridging

| Form | Stabilizer MB | Stabilizer Concentration (by weight) | Rating |
|---|---|---|---|
| Flake | UV-3853S | 50% active in LDPE | 4 |
| Cylindrical Pellet | UV-3853PP5 | 50% active in PP | 3 |
| CEP | UV-3853 | 70% active in PP | 1 |

Example 4: Comparative study of agglomeration—clumping and blocking of additives. This experiment is done to assess the clumping, blocking and friability of stabilizer powders (and other forms) during storage and handling at temperatures above ambient temperature. The melting points of some additives are quite low (25-40° C.), which leads to clumping and handling problems in the summer months. Therefore, a test method has been developed to measure the relative clumping, blocking, friability and flow properties of additives or masterbatch pellets (20-60% additives in a polymer carrier) stored in excess of room temperature in the 40-60° C. range. Clumping refers to the agglomeration or sticking together of additive particles or masterbatch pellets. Blocking refers to the agglomeration of additive pellets resulting in reduced flow properties, and friability refers to additive particles or pellets that are easily crumbled or pulverized.

Procedure: Stabilizer amounts are provided in Table 3 below. The encapsulant was polypropylene (PP) for CEPs and cylindrical pellets. Placed 50 grams of each sample in a 250-mL beaker, placed a slightly smaller jar on top of the powder or pellets, then put a 500-gram weight on top of the smaller jar to apply constant pressure. Placed the sample in a forced air oven (Blue M Oven) at 40, 50, or 60° C. for 24 hours. (A fresh sample was used for each temperature exposure.) Cooled to room temperature for two hours. Rated the sample for clumping, blocking, friability and flow properties using the rating system below:
Rating of 1—Free-flowing
Rating of 2—Some lumps, break apart easily (friable)
Rating of 3—Mostly lumps, break apart with some effort (somewhat friable)
Rating of 4—Mostly lumps, does not break apart
Rating of 5—Fused solid
Results obtained at 50° C. are provided in Table 3 below.

TABLE 3

Comparative Study of Agglomeration

| No. | Form | Stabilizer and Concentration | Outer Layer | Agglomeration Rating (50° C.) |
|---|---|---|---|---|
| 1 | CEP | 50 wt. % UV-3853 | PP | 1 |
| 2 | CEP | 60 wt. % UV-3853 | PP | 1 |
| 3 | CEP | 70 wt. % UV-3853 | PP | 1 |
| 4 | CEP | 50 wt. % UV-3853 | PE | 1 |
| 5 | CEP | 70 wt. % UV-3853 | PE | 1 |
| 6 | CEP | 60 wt. % UV-3853 | SAN | 1 |
| 7 | CEP | 60 wt. % UV-3853 | SAN | 1 |
| 8 | CEP | 50 wt. % UV-3853 | PPC | 1 |
| 9 | CEP | 70 wt. % UV-3853 | PPC | 1 |
| 10 | Flake | UV-3853S (50 wt. % active in LDPE) | None | 3 |
| 11 | Round Pellets | UV-3853PP5 (50 wt. % active in PP) | None | 3 |
| 12 | Cylindrical Pellets | UV-3853PP5 (50 wt. % active in PP) | PP | 4 |

Figure 4A:
FIGS. 4A-B—Comparative study of agglomeration of additives.
Figure 4B:
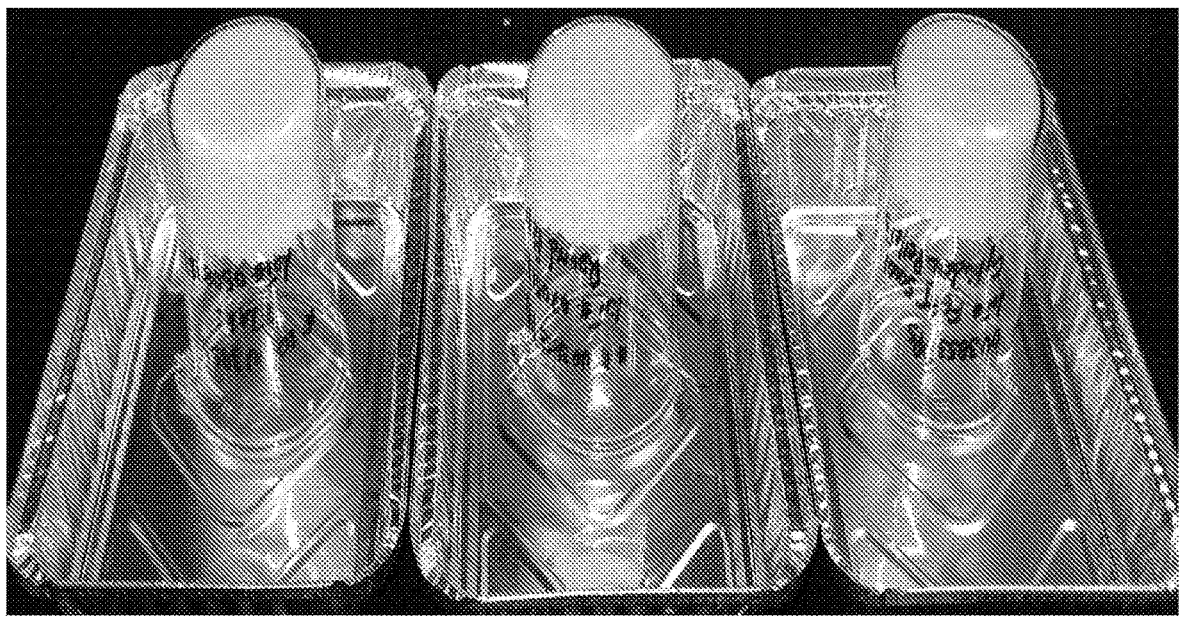
Figure 5:
FIGS. 5A-I—Evaluation of friability during transportation (shaker test).
Figure 5:
Figure 5:
Figure 5:
Figure 5:
Figure 5:
Figure 5:
Figure 5:
Figure 5:

FIG. 4A shows photographic results of Samples 1-3, and FIG. 4B shows photographic results of Comparative Samples 10-12.

Example 5: Evaluation of friability during transportation: shaker test (Red Devil Shaker-Model #5400). A test was designed to evaluate the CEP stabilizers of the instant invention against the state of the art material forms, namely MB and skin MB. The problem occurs when during transportation and shipping some stabilizers or stabilizer blends can become friable, producing a significant amount of fines that may not be acceptable to the end user.

The samples were tested as follows. Filled a tared, open-mouthed, 16-oz. glass jar with the sample so it was ⅓ filled. (Roughly 140 grams for pellets). Care was taken to avoid adding powder to the jar. Closed jar with the appropriate lid. Placed the jar on the Red Devil Shaker (Model #5400) and securely tightened the clamp by screwing the base upward to ensure that the sample jar did not inadvertently loosen during the shaking process. The samples were shaken for 5 minutes. The contents of the jar were emptied through a 35-mesh (0.011 inch wire diameter—0.0175 inch opening) screen onto a foil tray. The weight of "fines" was the combined weight of powder in the tray and residual powder in the beaker.

TABLE 4

Percent Loss of the Stabilizer due to Friability During Transportation

| No. | Form | Stabilizer and Concentration | Encapsulant | % Loss | FIG. |
|---|---|---|---|---|---|
| 1 | CEP | 50 wt. % UV-3853 | PP | 0.00% | 5A |
| 2 | CEP | 60 wt. % UV-3853 | PP | 0.03% | 5B |
| 3 | CEP | 70 wt. % UV-3853 | PP | 0.00% | 5C |
| 4 | CEP | 50 wt. % UV-3853 | PE | 0.01% | 5D |
| 5 | CEP | 70 wt. % UV-3853 | PE | 0.00% | 5E |
| 6 | CEP | 60 wt. % UV-3853 | SAN | 0.07% | 5F |
| 7 | CEP | 60 wt. % UV-3853 | SAN | 0.07% | — |
| 8 | CEP | 50 wt. % UV-3853 | PPC | 0.00% | — |
| 9 | CEP | 70 wt. % UV-3853 | PPC | 0.00% | — |
| 10 | Flake | UV-3853S (50 wt. % active in LDPE) | None | 16.39% | 5G |

TABLE 4-continued

Percent Loss of the Stabilizer due to Friability During Transportation

| No. | Form | Stabilizer and Concentration | Encapsulant | % Loss | FIG. |
|---|---|---|---|---|---|
| 11 | Round Pellets | UV-3853PP5 (50% active in PP) | None | 0.22% | 5H |
| 12 | Cylindrical Pellets | UV-3853PP5 (50% active in PP) | PP | 0.21% | 5I |

Example 7: Polymer diluent in core. Closed end pellets are prepared with CYASORB® UV-3853S, which is composed of 50 wt. % UV-3853 and 50 wt. % LDPE, as the core, and PP as the outer layer encapsulating the core. The core and outer layer are 60 wt. % and 40 wt. % respectively, of the total weight of the CEP. Thus, the overall composition of the CEP is 30 wt. % UV-3853, 30 wt. % LDPE, and 40 wt. % PP.

Example 8. Stabilizer in outer layer encapsulating the core. Closed end pellets are prepared with CYASORB® UV-3853 (100% active) as the core, and a mixture of 50 wt. % CYASORB® UV-3346 and 50 wt. % PP as the outer layer encapsulating the core. The core and outer layer are 60 wt. % and 40 wt. % respectively, of the total weight of the CEP. Thus, the overall composition of the CEP is 60 wt. % UV-3853, 20 wt. % UV-3346, and 20 wt. % PP.

Example 9. Comparison of dissolution times in styrene for different forms of phenothiazine. Dissolution time was defined as the time for the phenothiazine (2 wt. %) as well as the polystyrene carrier (for prill) or encapsulant (for CEP) to dissolve completely in styrene to form a homogeneous solution. The results are summarized in the table below, and demonstrate that the CEP form of phenothiazine is readily soluble in styrene monomer, dissolving completely, and as rapidly as the prill form. The polystyrene polymer completely dissolves in the styrene monomer, minimizing any adverse effects on any subsequent production operations, including distillation.

TABLE 5

Evaluation of Dissolution Time in Styrene

| | Powder | Prill | CEP |
|---|---|---|---|
| Dissolution Time (min.) | 7 | 21 | 21 |
| Average particle size (μm) | 350 | 1,000 | 10,000 |

Example 10. Comparison of friability and integrity of different forms of phenothiazine. Samples of phenothiazine powder, prill in polystyrene, and CEP (encapsulated in polystyrene) were placed in a jar and vigorously shaken. The samples were visually evaluated for dust formation just after adding the sample and again after vigorous shaking. The results are summarized in Table 6 below, in which the degree of dusting was characterized as "none", "slight", or "moderate".

TABLE 6

Evaluation of Dust Formation

| Visual Evaluation | Powder | Prill | CEP |
|---|---|---|---|
| Initial | Slight | None | None |
| After shaking | Moderate | Slight | None |

These results demonstrate that the CEP form of phenothiazine has excellent product integrity and is less prone to powder and dust generation than even the prill form. Based on these results, the CEP form is expected to be less prone to caking/clumping or bridging/clogging in processing equipment, eliminates direct exposure of workers to the phenothiazine, and minimizes any dust explosion hazards.

CEPs of other monomer stabilizers (i.e. inhibitors), both individually and in combination, can also be made. Other thermoplastic polymers disclosed herein could be used as the encapsulant to prepare the CEPs. The selection of thermoplastic polymer depends in part upon its dissolution rate into the inhibited monomer or solvent.

Various patent and/or scientific literature references have been referred to throughout this application. The disclosures of these publications in their entireties are hereby incorporated by reference as if written herein. In view of the above description and the examples, one of ordinary skill in the art will be able to practice the disclosure as claimed without undue experimentation.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

We claim:

1. A resin masterbatch composition provided as closed end pellets, said composition comprising
a core material comprising a stabilizing amount of at least one stabilizer additive; and
an outer layer comprising a thermoplastic polymer, wherein the outer layer has a thickness of from 0.001 mm to 1 cm, and wherein the outer layer is co-extruded with and encapsulates said core material such that the pellets are sealed at each end and are leak-free.

2. The resin masterbatch composition as defined in claim 1, wherein the stabilizer additive comprises at least one compound selected from the group consisting of a hindered amine light stabilizers (HALS), an organic phosphite or phosphonite, a hindered phenol, a chromane, an ultraviolet light (UV) absorber, a hindered benzoate, a hydroxylamine, a tertiary amine oxide, and a free radical polymerization inhibitor.

3. The resin masterbatch composition as defined in claim 2, wherein the stabilizer additive comprises hindered amine light stabilizers selected from esters of 2,2,6,6-tetramethyl-4-piperidinol with $C_{12-2}$-saturated and $C_{18}$-unsaturated fatty acids.

4. The resin masterbatch composition as defined in claim 2, wherein the stabilizer additive comprises at least one free radical polymerization inhibitor selected from the group consisting of phenothiazine, a phenothiazine derivative, hydroquinone, hydroquinone monomethyl ether (MEHQ), and tent-butyl catechol (TBC).

5. The resin masterbatch composition as defined in any one of claims 1 to 4, wherein the thermoplastic polymer comprises at least one member selected from the group consisting of: polyolefins, polyesters, polyethers, polyketones, polyamides, natural and synthetic rubbers, polyurethanes, polystyrenes, high-impact polystyrenes, polyacrylates, polymethacrylates, polyacetals, polyacrylonitriles, polybutadienes, acrylonitrile-butadiene-styrene terpolymers, styrene-acrylonitrile copolymers, acrylate-styrene-acrylonitrile terpolymers, cellulosic acetate butyrate, cellulosic polymers, polyimides, polyamideimides, polyetherimides, polyphenylene sulfides, polyphenylene oxides, polysulfones, polyethersulfones, polyvinyl chlorides, polycarbonates, and ethylene-vinyl acetate copolymers.

6. The resin masterbatch composition as defined in claim 5, wherein the thermoplastic polymer comprises of polyethylene, polypropylene, a polypropylene copolymer, polystyrene, or a styrene-acrylonitrile copolymer.

7. The resin masterbatch composition as defined in claim 1 or claim 2, wherein the core material further comprises a thermoplastic polymer diluent that is the same or different than the thermoplastic polymer in the outer layer.

8. The resin masterbatch composition as defined in claim 1 or claim 2, wherein the outer layer further comprises at least one stabilizer additive.

9. A process for producing the resin masterbatch composition as defined in claim 1, the process comprising:
co-extruding a core material encapsulated by an outer layer to form a filled tube, wherein the core material comprises a stabilizing amount of at least one stabilizer additive, and the outer layer comprises a thermoplastic polymer having a thickness from 0.001 mm to 1 cm;
passing the filled tube into a sealing device that cuts the filled tube into multiple discrete segments and simultaneously seals each end of each discrete segment, thereby forming closed end pellets that are leak free; and
cooling the closed end pellets.

10. The process as defined in claim 9, wherein at least two filled tubes are simultaneously extruded, cut, sealed, and cooled with the same device, to form at least two process streams of closed end pellets.

11. A resin masterbatch composition as defined in claim 5, wherein the core material is solid, semi-solid, waxy, or liquid at 25° C., and is from 10 wt. % to 95 wt. % of the total weight of the closed end pellet.

12. A resin masterbatch composition as defined in claim 11, wherein the core material is from 30 wt. % to 90 wt. % of the total weight of the closed end pellet.

13. A resin masterbatch composition as defined in claim 10, wherein the core material is from 40 wt. % to 80 wt. % of the total weight of the closed end pellet.

* * * * *